United States Patent [19]
Kuriyama

[11] Patent Number: 6,040,229
[45] Date of Patent: Mar. 21, 2000

[54] METHOD FOR MANUFACTURING A SOLID ELECTROLYTIC CAPACITOR ARRAY

[75] Inventor: Chojiro Kuriyama, Kyoto, Japan

[73] Assignee: Rohm Co., Ltd., Kyoto, Japan

[21] Appl. No.: 09/175,786

[22] Filed: Oct. 20, 1998

Related U.S. Application Data

[62] Division of application No. 08/920,517, Aug. 29, 1997, Pat. No. 5,926,363.

[30] Foreign Application Priority Data

Aug. 30, 1996 [JP] Japan ................................ 8-230749

[51] Int. Cl.$^7$ .................................................. H01L 21/20
[52] U.S. Cl. ........................................... 438/396; 438/399
[58] Field of Search ..................... 438/396, 397, 438/393, 398, 399; 361/321, 328

[56] References Cited

U.S. PATENT DOCUMENTS

| | | |
|---|---|---|
| 4,097,916 | 6/1978 | Piper . |
| 4,616,290 | 10/1986 | Watanabe et al. . |
| 4,853,827 | 8/1989 | Hernandez . |

FOREIGN PATENT DOCUMENTS

| | | |
|---|---|---|
| 4-3406 | 1/1992 | Japan . |
| 6-20891 | 4/1993 | Japan . |
| 405299311A | 11/1993 | Japan . |

*Primary Examiner*—Charles Bowers
*Assistant Examiner*—Craig Thompson
*Attorney, Agent, or Firm*—Hoffmann & Baron, LLP

[57] ABSTRACT

A solid electrolytic capacitor array includes a substrate (12) made of conductive silicon, and an insulation film (15) which is formed with a plurality of contact holes is formed on an upper surface of the substrate. A plurality of contact layers (18) which are respectively connected to the substrate through the contact holes is formed on the insulation film. A plurality of chips each of which is a sintered unit of tantalum powder are arranged on the contact layers, respectively. A plurality of solid electrolytic layers which are respectively electrically insulated from the tantalum powder of the chips by insulation films are provided on the chips, respectively. A covering resin layer (25) covers the chips in a manner that portions of the solid electrolytic layers of the chips are respectively exposed, and cathode electrodes are formed on the covering resin layer so as to be electrically conducted to the solid electrolytic layers being exposed from the covering resin layer. An anode electrode (28) are formed on a lower surface of the substrate so as to be electrically conducted to the tantalum powder of the respective chips via the substrate and the contact layers.

8 Claims, 29 Drawing Sheets

METHOD FOR MANUFACTURING A SOLID ELECTROLYTIC CAPACITOR ARRAY

CROSS REFERENCE TO RELATED APPLICATIONS

This application is a Divisional application of U.S. application Ser. No. 08/920,517, filed on Aug. 29, 1997 now U.S. Pat. No. 5,926,363.

BACKGROUND OF THE INVENTION

1. Field of the Invention

The present invention relates to a solid electrolytic capacitor array and a method for manufacturing the same. More specifically, the present invention relates to a socalled solid electrolytic capacitor array in which a plurality of capacitor elements each having a sintered unit of valve-metallic powder are arranged in parallel with each other and integrally packaged, and a method for manufacturing such solid electrolytic capacitor arrays.

2. Description of the Prior Art

Examples of such a kind of solid electrolytic capacitor array are disclosed in, for example, FIG. 3 of U.S. Pat. No. 4,097,916 issued on Jun. 27, 1978, Japanese Patent Application Laying-open No. 4-3406 issued on Jan. 8, 1992, FIG. 11 of Japanese Patent Application Laying-open No. 6-20891 issued on Jan. 28, 1994, and etc.

Then, there is an advantage in such the solid electrolytic capacitor array that in a case where a plurality of solid electrolytic capacitors are used in a circuit board of an electric equipment, it is possible to reduce the number of steps for mounting the capacitors on the circuit board and a mounting space necessary for mounting the capacitors on the circuit board in comparison with a case where a plurality of solid electrolytic capacitors each having only a single capacitor element are mounted on the circuit board.

Furthermore, in a case of a solid electrolytic capacitor array in which a plurality of capacitor elements are connected in parallel with each other and integrally packaged, it is possible to reduce electric resistance at cathode electrodes of the capacitor elements, and therefore, there is an advantage that impedance in a high-frequency region can be lowered in comparison with a case where a capacitor having the same capacity is constructed by only a single capacitor element.

Each of the prior art solid electrolytic capacitor arrays utilizes a capacitor element A which is manufactured as follows:

First, as shown in FIG. 1, powder of valve-metal such as tantalum are tamped and formed into a porous chip A1 from which an anode wire A2 made of metal such as tantalum is projected, and thereafter, the porous chip A1 is sintered.

Next, as shown in FIG. 2, in a state where the chip A1 is immersed in a chemical conversion liquid such as an aqueous solution of phosphoric acid, a DC current is applied between the anode wire A2 and the chemical conversion liquid so as to perform anodization. Consequently, a dielectric film A3 such as ditantalum pentaoxide is formed on surfaces of the metallic powder or particles in the chip.

Then, a step for firing the chip A1 after the chip A1 is immersed in an aqueous solution of manganese nitrate so as to permeate the manganese nitrate solution into an inside of the chip A1 and pulled-out is repeated a plurality of times. Consequently, a solid electrolytic layer A4 is formed on a surface of the dielectric film A3 by metal oxide such as manganese dioxide.

Lastly, after a graphite layer is formed on a surface of the solid electrolytic layer A4 of the chip A1, a cathode electrode A5 is formed by a metallic film such as silver, nickel, and etc., whereby the capacitor element A can be obtained.

As described above, in the solid electrolytic capacitor, in manufacturing the capacitor element A, the anode wire A2 projected from the chip A1 is indispensable, and therefore, the anode wire A2 can not be eliminated.

Therefore, in the prior art, after a plurality of capacitor elements A each thus manufactured are arranged in parallel with each other, the capacitor elements A are to be integrally molded by a package unit made of synthetic resin in a manner that the package unit covers not only the chips of the capacitor elements but also the anode wires A2 being projected from the chips.

Therefore, a size of the package unit becomes large in comparison with a size of the chip A1 of the capacitor element A by a portion of the anode wire A2 is projected from the chip A1, and therefore, a rate of a volume of the chip A1 of the capacitor element A with respect to a volume of a whole capacitor, and accordingly, a volumetric efficiency becomes low. Furthermore, an effective volume of the chip A1 of the capacitor element A becomes small because a portion of the anode wire A2 is embedded in the chip A1.

For these reasons, in the prior art, there was a problem that it is difficult to make a capacity per unit volume large, and thus, a weight of the capacitor also becomes large.

Furthermore, in the prior art, in molding the plurality of capacitor elements A by the package unit of the synthetic resin, a large stress acts on the chip A1 of the capacitor element A, and therefore, there are much possibilities that a leakage current (LC) increases and an insulation defect occurs. Accordingly, in manufacturing the capacitor, an incidence of inferior products is high, and thus, an yield rate is low.

Furthermore, in the prior art, in a case where the plurality of capacitor elements A are to be simultaneously manufactured, the anode wires A2 which are respectively projected from the plurality of the sintered chips are fit to a metal rod such as tantalum, and in its state, a step for forming the dielectric film A3 by the anodization in the chemical conversion liquid, a step for forming the solid electrolytic layer A4 in the aqueous solution of manganese nitrate, a step for forming the graphite layer, and a step for forming the cathode electrode A5 are performed, and then, respective capacitor elements A are cut-out of the metal rod. Therefore, the number of the capacitor elements A capable of being manufactured with using a single metal rod is limited, and it is impossible to largely increase the number of the capacitor elements A, and therefore, it is difficult to manufacture the capacitor elements by mass-production. Furthermore, it is necessary to provide a step for incorporating a plurality of capacitor elements A thus manufactured in a single component, and therefore, there was a problem that not only an yield rate is low but also a manufacturing cost largely increases.

SUMMARY OF THE INVENTION

Therefore, a principal object of the present invention is to provide a novel solid electrolytic capacitor array capable of solving the above-described problems.

Another object of the present invention is to provide a novel method for manufacturing solid electrolytic capacitor arrays.

A solid electrolytic capacitor array according to the present invention comprises: a substrate having an upper surface and a lower surface; a plurality of chips arranged on the upper surface of the substrate with a space, the chip being formed by sintering metallic powder: a plurality of solid electrolytic layers respectively formed on surfaces of the plurality of chips and electrically insulated from the metallic powder, the plurality of solid electrolytic layers being independent from each other; a covering resin layer which covers the plurality of chips in a manner that respective portions of the plurality of solid electrolytic layers are exposed; at least one cathode electrode formed on the covering resin layer and electrically conducted to respective exposed portions of the plurality of solid electrolytic layers; and at least one anode electrode formed on the lower surface of the substrate and electrically conducted to the metallic powder of the plurality of chips.

In accordance with the present invention, it is possible to eliminate the anode wire utilized in the prior art, and therefore, an effective volume of the chip of the capacitor element is not reduced by the anode wire, and accordingly, a rate of a volume of the chip with respect to a whole volume of the capacitor array can be surely increased in comparison with the prior arts, and therefore, it is possible to implement drastic increase of a volumetric efficiency and miniaturization.

Filling recess portions may be provided on the substrate, and the metallic powder for forming the chips may be filled in the filling recess portions. In such a case, the volume of the chip is increased, and therefore, the volumetric efficiency can be made higher, and accordingly, a capacity per unit volume can be made larger in the solid electrolytic capacitor array. Especially, in a case where the filling recess portions are formed by through holes, it is possible to further increase the volume of the chip, and the anode electrode formed on the lower surface of the substrate can be directly brought into contact with the metallic powder filled in the throughholes, and therefore, it is possible to increase reliability of electrical conductivity between the metallic powder of the chips and the anode electrode.

The substrate may be made of material having, conductivity in at least a thickness direction, and the metallic powder of the chips may be electrically connected to the substrate on which the anode electrode is formed. In this case, the substrate itself functions as the anode wire in the prior art, and is effective in increasing the volumetric efficiency. Furthermore, if an insulation layer is formed on the substrate in a manner that the insulation layer surrounds a periphery of each of the chips, it is possible to electrically isolate the substrate at a side of the anode electrode and the solid electrolytic layer at a side of the cathode electrode from each other, and therefore, it is possible to surely prevent a short-circuit from occurring therebetween.

A method for manufacturing solid electrolytic capacitor arrays according to the present invention comprises steps of: (a) preparing a motherboard having an area capable of cutting-out a plurality of substrates: (b) forming a plurality of chips on the plurality of substrate included in the motherboard, respectively, each of the plurality of chips being formed by sintering metallic powder; (c) forming a plurality of solid electrolytic layers on surfaces of the plurality of chips in a manner that the plurality of electrolytic layers are electrically insulated from the metallic powder, the plurality of solid electrolytic layers being independent from each other; (d) forming a covering resin layer which covers the plurality of chips in a manner that portions of the plurality of solid electrolytic layers are respectively exposed; (e) forming a plurality of cathode electrodes on the covering resin layer in a manner that the plurality of cathode electrodes are electrically connected to the plurality of solid electrolytic layers, respectively; (f) forming a plurality of anode electrodes on a lower surface of the motherboard in a manner that the plurality of anode electrodes are electrically connected to the metallic powder of the plurality of chips, respectively; and (g) cutting-out the plurality of substrate from the motherboard.

In accordance with the manufacturing method of the present invention, the respective chips can be simultaneously formed on the respective substrate. Furthermore, formation of the solid electrolytic layers, formation of the covering resin layer, formation of the anode electrode and formation of the cathode electrodes can be continuously performed in a state where the plurality of chips are formed on the motherboard. Then, by cutting-out the motherboard finally for each of the substrates between the respective chips, a plurality of solid electrolytic capacitor arrays can be manufactured simultaneously. Therefore, in comparison with the prior art that a plurality of solid electrolytic capacitor arrays are separately manufactured, the manufacturing method of the present invention is suitable for mass-production.

The above-described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 16:
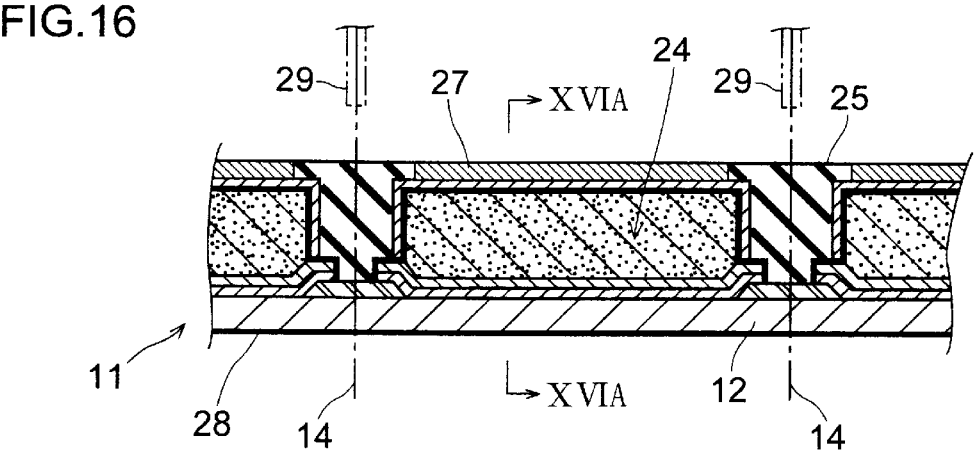
FIG. 16 is an enlarged sectional view showing a state where cathode electrodes and an anode electrode are formed in the first embodiment.
Figure 17:
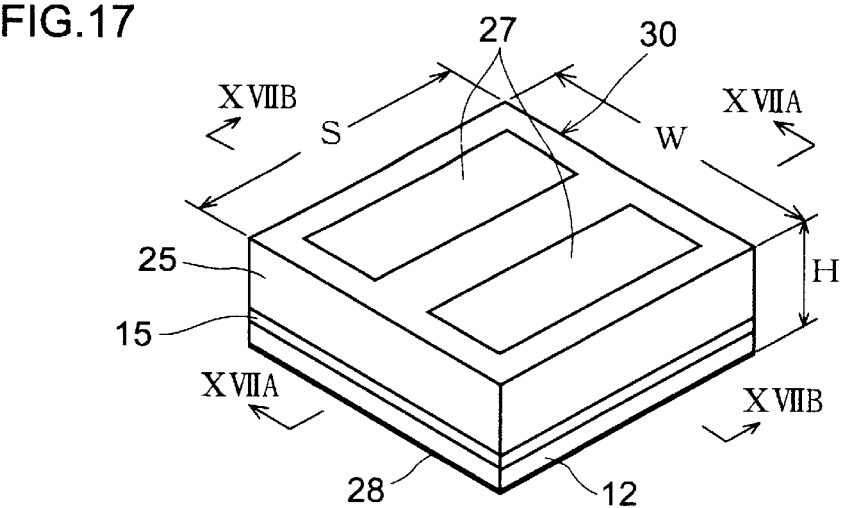
FIG. 17 is a perspective view showing a solid electrolytic capacitor array manufactured in the first embodiment.
Figure 18:
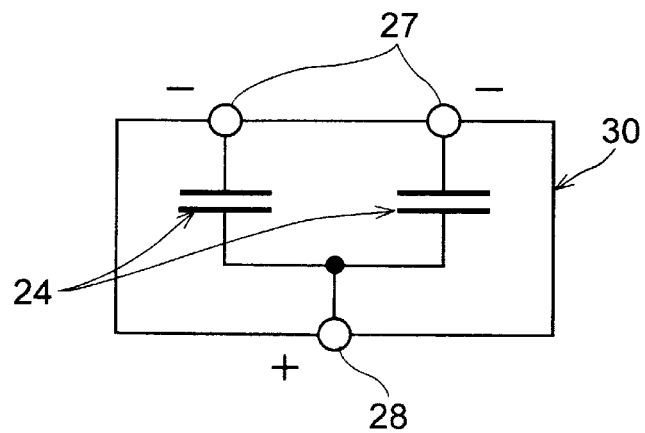
FIG. 18 is an equivalent circuit diagram of the solid electrolytic capacitor array manufactured in the first embodiment.

In a first embodiment according to the present invention shown in FIG. 3 to FIG. 18, by utilizing a motherboard made of silicon, a tantalum solid electrolytic capacitor array 30 shown by FIG. 17 and FIG. 18 is manufactured.

Figure 1:
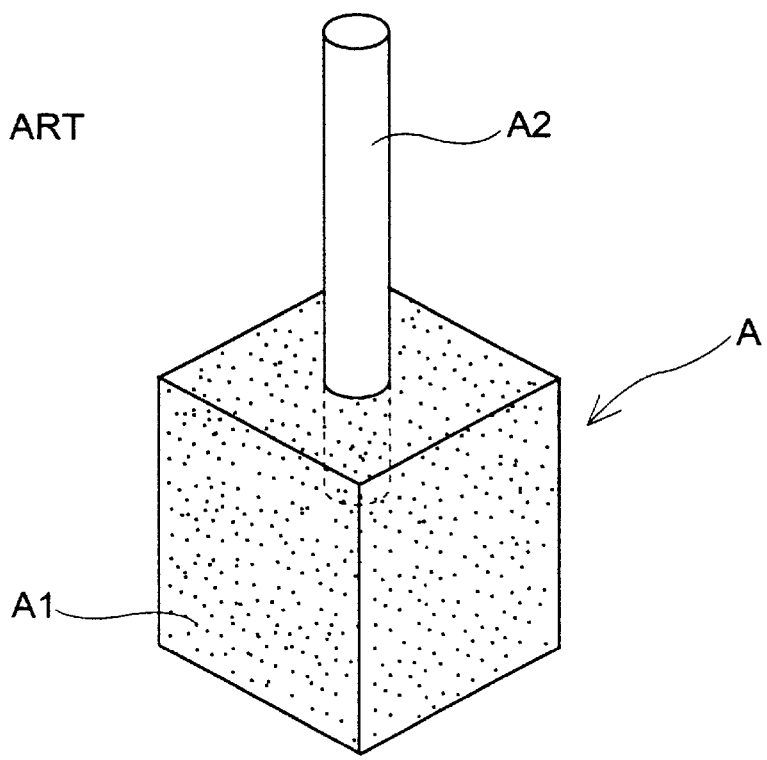
FIG. 1 is a perspective view showing a prior art capacitor element.
Figure 2:
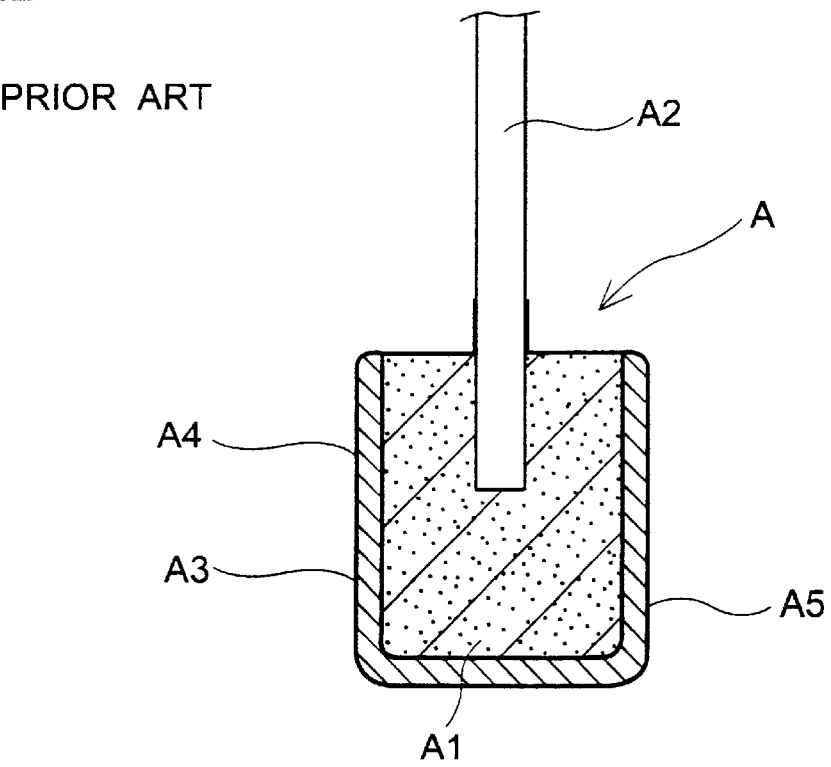
FIG. 2 is a longitudinally sectional front view of FIG. 1 capacitor element.
Figure 3:
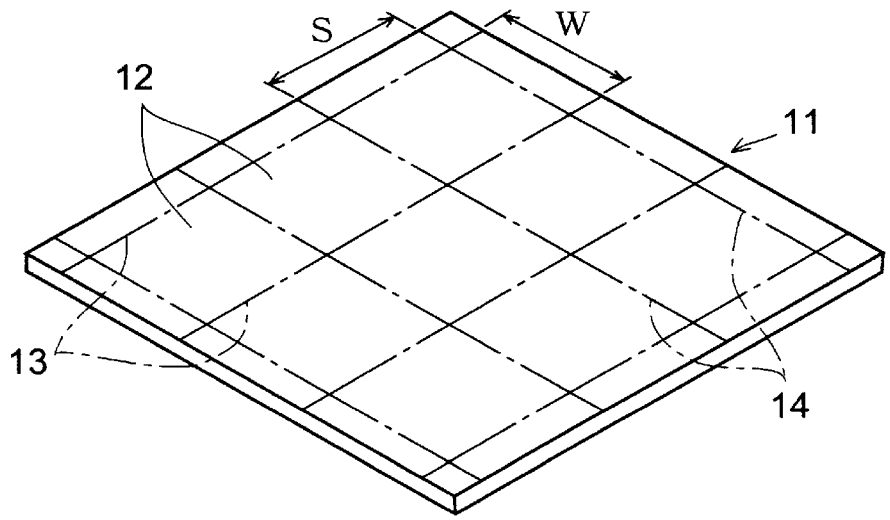
FIG. 3 is a perspective view showing a motherboard utilized in a first embodiment according to the present invention.

In the first embodiment, as shown in FIG. 3, a motherboard 11 which is processed so as to have electrical conductivity in at least a thickness direction and made of silicon is prepared. The motherboard 11 has a size which includes a plurality of substrates 12 each of which is a rectangular shape having a width W and length S, that is, the motherboard 11 has an area capable of cutting-out the plurality of the substrates 12. As described later, the motherboard 11 provides the plurality of substrates when the motherboard 11 is, in a final working step, cutout along a longitudinal cutting line 13 and a lateral cutting line 14.

Figure 4:
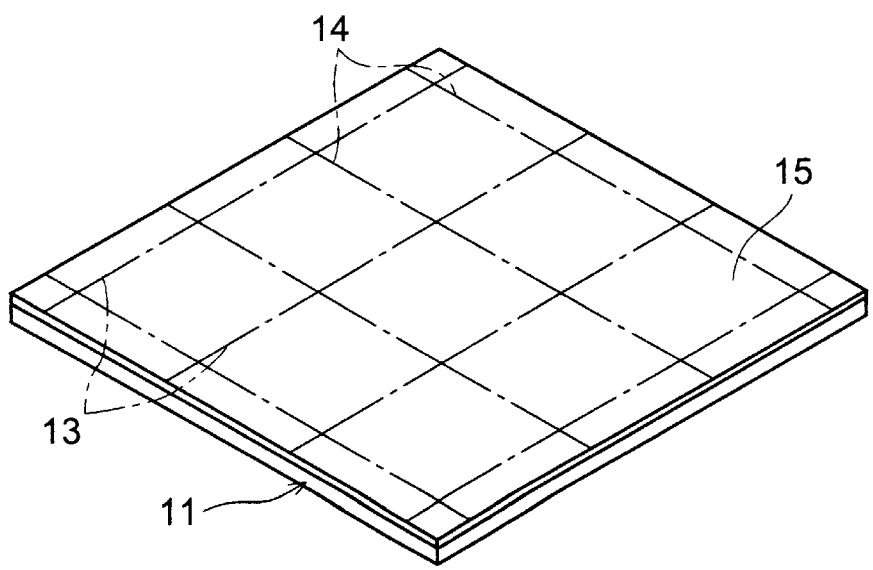
FIG. 4 is a perspective view showing a state where an insulation layer is formed on an upper surface of the motherboard.

Next, as shown in FIG. 4, an insulation film 15 such as silicon oxide or silicon nitride is formed by thermal oxidation, PV sputtering, plasma CVD or the like.

Figure 5:
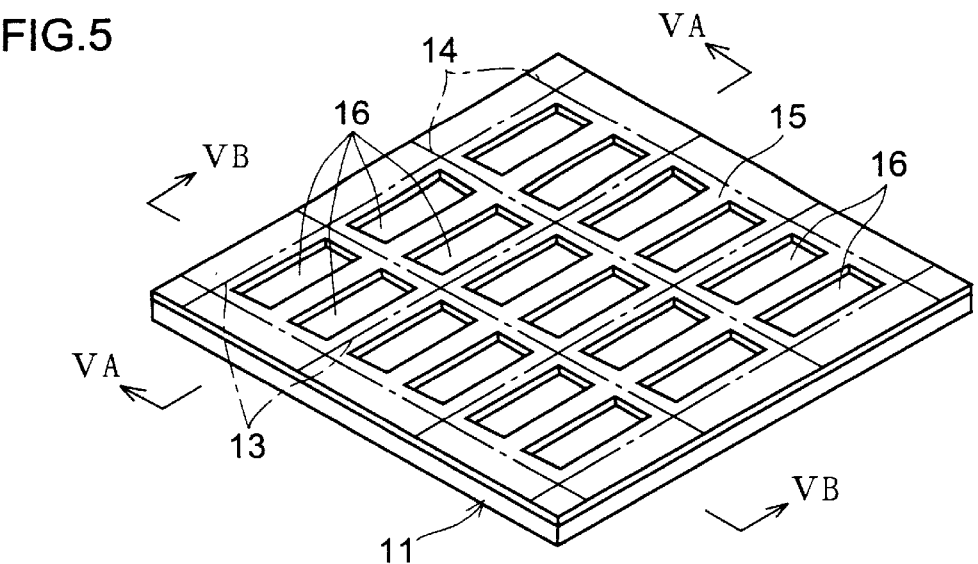
FIG. 5 is a perspective view showing a state where contact holes are formed in the insulation layer on the motherboard.
Figure 5A:
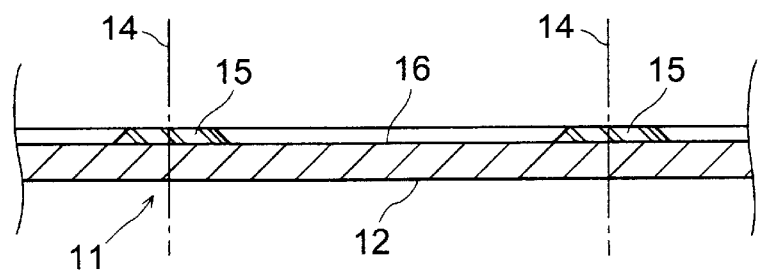
FIG. 5A is an enlarged sectional view at a line VA—VA in FIG. 5.
Figure 5B:
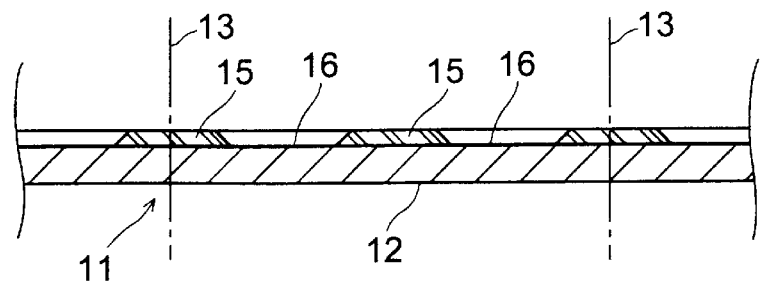
FIG. 5B is an enlarged sectional view at a line VB—VB in FIG. 5.

Then, as shown in FIG. 5, FIG. 5A and FIG. 5B, a plurality of (two, in this embodiment shown) contact holes 16 are formed on the insulation film 15 at positions corresponding to each of the substrates 12 by a well-known photo-lithography technique.

In the photo-lithography technique, a photo-resist film (not shown) is first formed on an upper surface of the insulation film 15. A photo-mask (not shown) which is provided with windows having the same shapes of the contact holes 16 is put on the photo-resist film. After exposing the photo-resist film thus masked, the photo-resist film is developed, whereby portions corresponding to the windows of the photo-resist film are removed. In such a state, by etching the insulation film 15, the portions of the insulation film 15 corresponding to the windows of the photo-resist film are solved and removed by an etching liquid, and consequently, the contact holes are formed.

Figure 6:
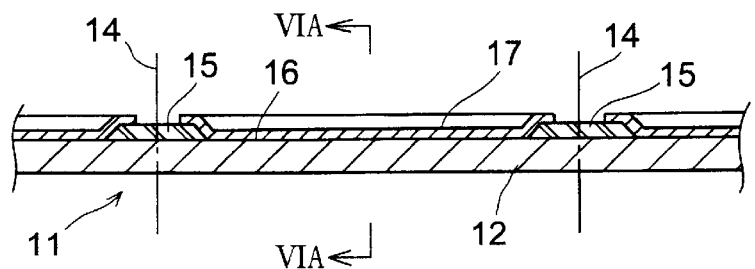
FIG. 6 is an enlarged sectional view showing a state where thin films made of tantalum silicide are formed in the contact holes in the first embodiment.
Figure 6A:
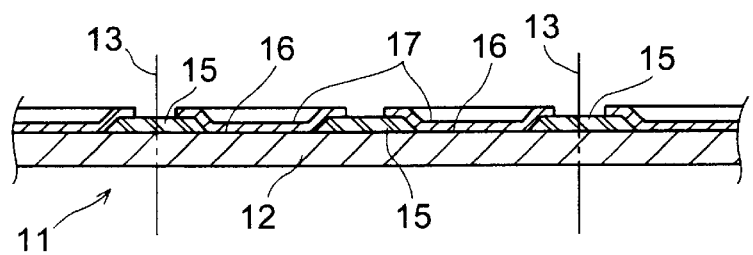
FIG. 6A is a sectional view at a line VIA—VIA in FIG. 6.

Then, as shown in FIG. 6 and FIG. 6A, thin films 17 such as tantalum silicide are formed at portions within the contact holes 16 on the substrate 12 of the motherboard 11 by spattering and etc.

Figure 7:
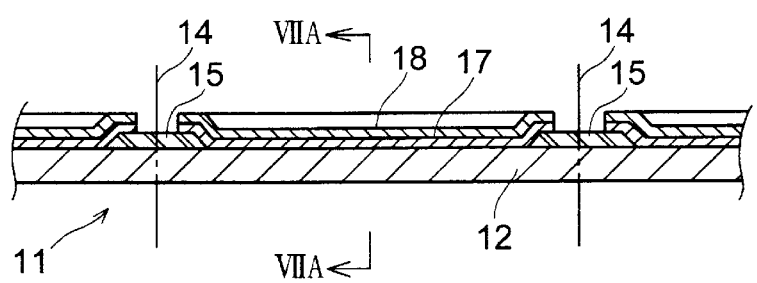
FIG. 7 is an enlarged sectional view showing a state where metallic contact layers are formed on the thin films made of tantalum silicide.
Figure 7A:
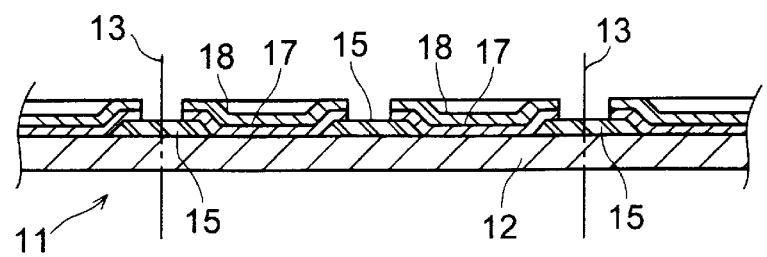
FIG. 7A is a sectional view at a line VIIA—VIIA in FIG. 7.
Figure 8:
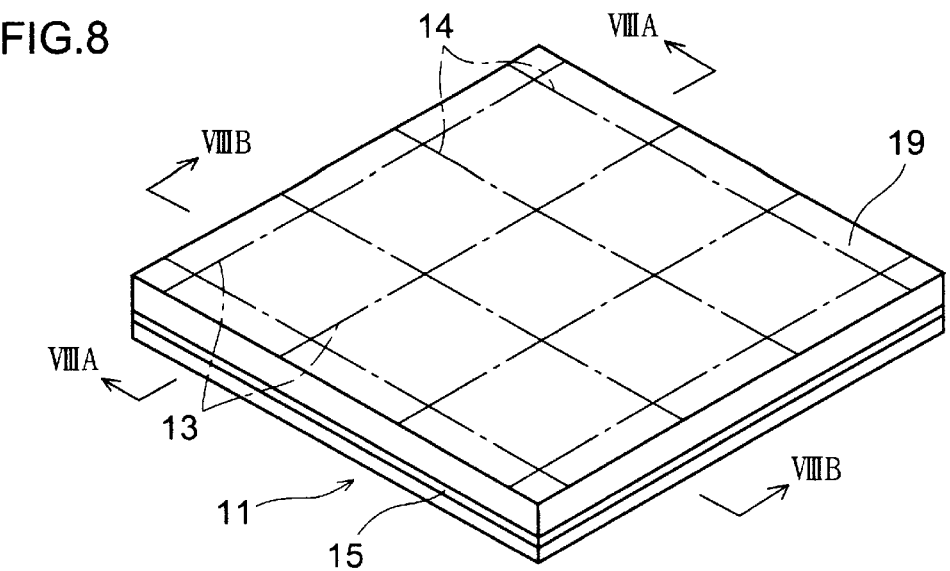
FIG. 8 is a perspective view showing a state where a forming frame layer is formed on the motherboard in FIG. 1 embodiment.
Figure 8A:
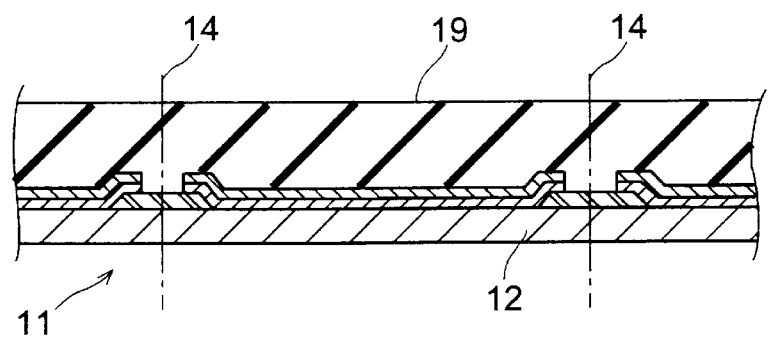
FIG. 8A is an enlarged sectional view at a line VIIIA—VIIIA in FIG. 8.
Figure 8B:
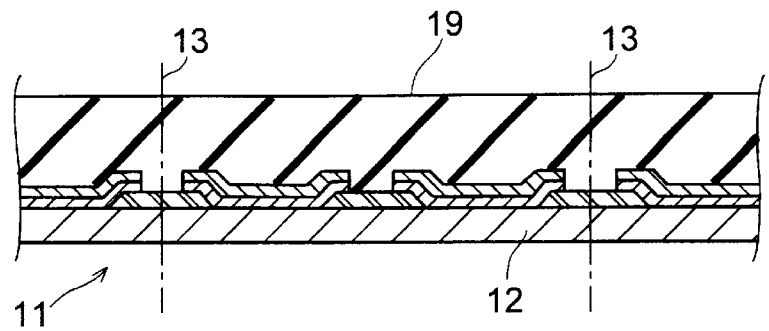
FIG. 8B is an enlarged sectional view at a line VIIIB—VIIIB in FIG. 8.

Next, as shown in FIG. 7 and FIG. 7A, as contact layers, metallic contact layers 18 are formed on the respective thin film 17 by tantalum by spattering and etc. Then, as shown in FIG. 8, FIG. 8A and FIG. 8B, a forming frame layer 19 is formed on the upper surface of the motherboard 11 as a whole with a relatively large thickness by synthetic resin and etc.

Figure 9:
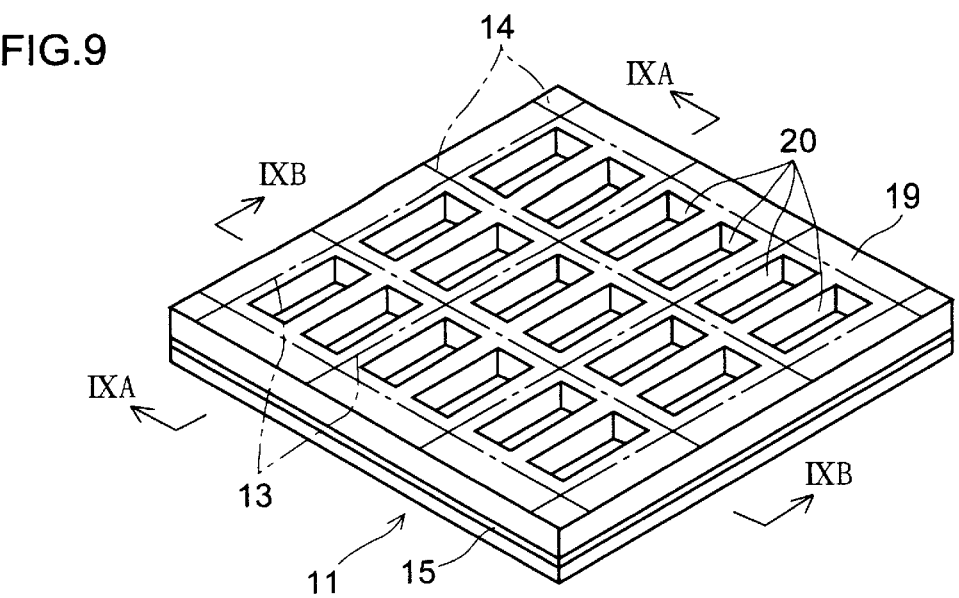
FIG. 9 is a perspective view showing a state where forming holes or spaces are formed in the forming frame layer.
Figure 9A:
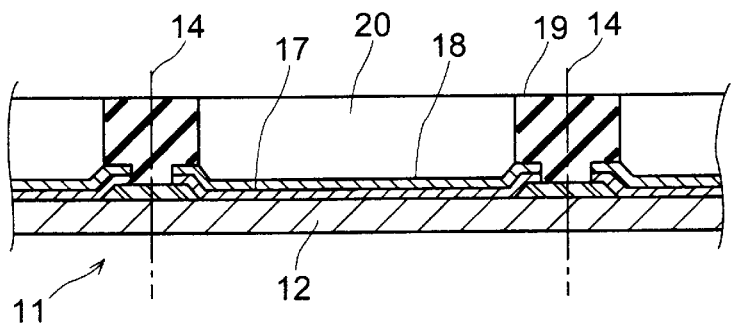
FIG. 9A is an enlarged sectional view at a line IXA—IXA in FIG. 9.
Figure 9B:
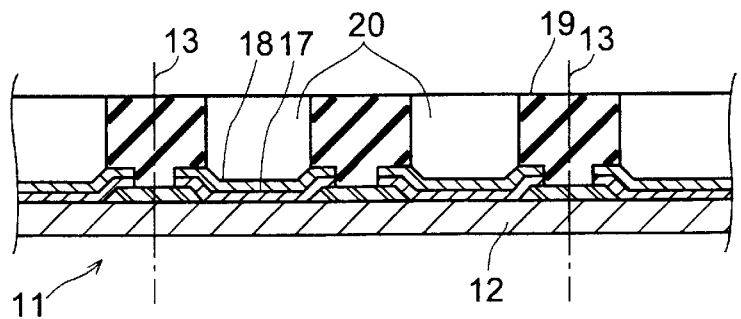
FIG. 9B is an enlarged sectional view at a line IXB—IXB in FIG. 9.

Next, as shown in FIG. 9, FIG. 9A, FIG. 9B, forming spaces 20 are formed on the forming frame layer 19 at portions each corresponding to each of the contact holes 16 on the substrate 12 by a photo-lithography technique. In addition, instead of working steps shown in FIG. 8 to FIG. 8B, a forming frame layer 19 on which forming spaces 20 are formed in advance may be adhered on the motherboard 11.

Figure 10:
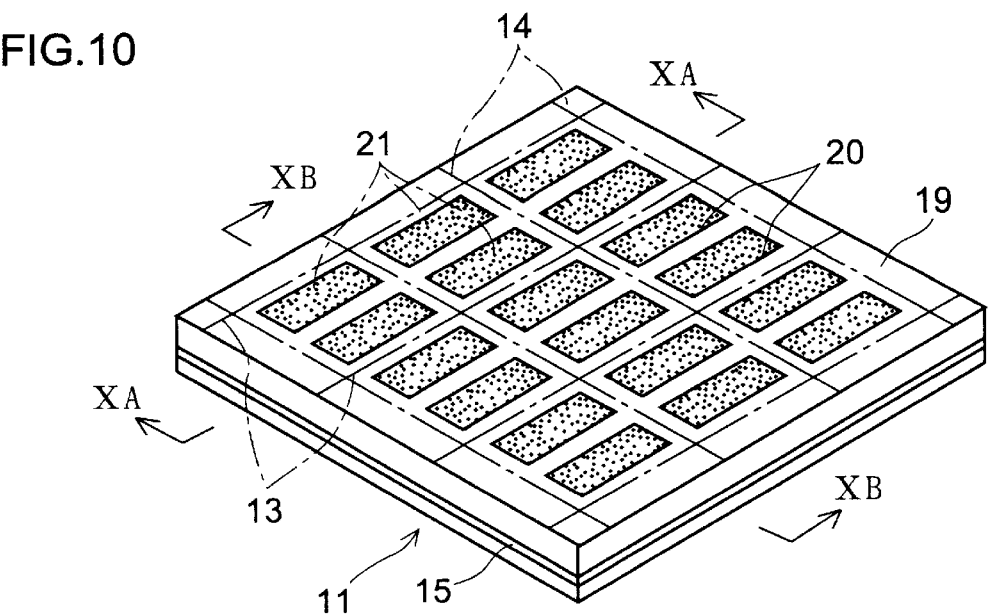
FIG. 10 is a perspective view showing a state where chips are formed by tamping tantalum powder in the forming holes of the forming frame layer.
Figure 10A:
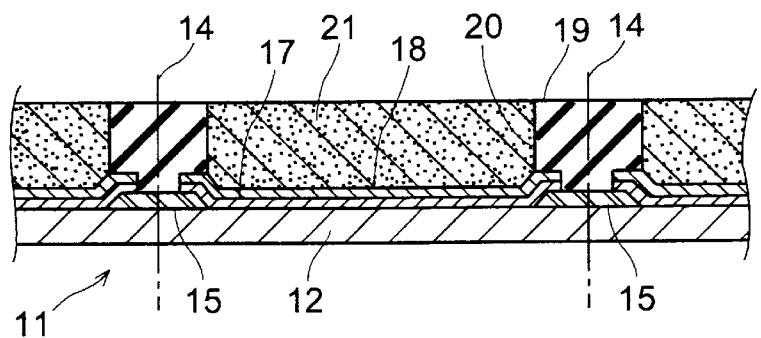
FIG. 10A is an enlarged sectional view at a line XA—XA in FIG. 10.
Figure 10B:
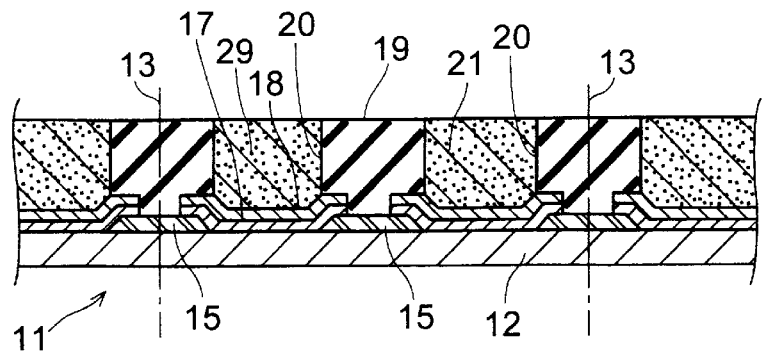
FIG. 10B is an enlarged sectional view at a line XB—XB in FIG. 10.

Furthermore, as shown in FIG. 10, FIG. 10A and FIG. 10B, a suitable amount of tantalum powder into which binders are mixed in advance are filled in the respective forming spaces 20 of the forming frame layer 19, and by tamping the tantalum powder, porous chips 21 are formed. Thereafter, a debinder process for removing the binders by heating or the like is performed.

Figure 11:
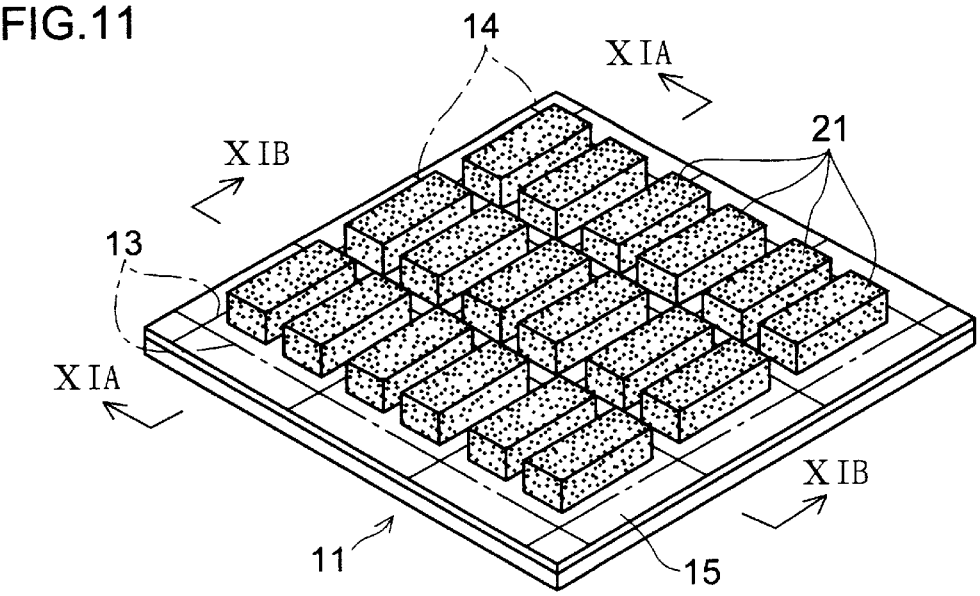
FIG. 11 is a perspective view showing a state where the forming frame layer is removed after the chips are tamped and formed.
Figure 11A:
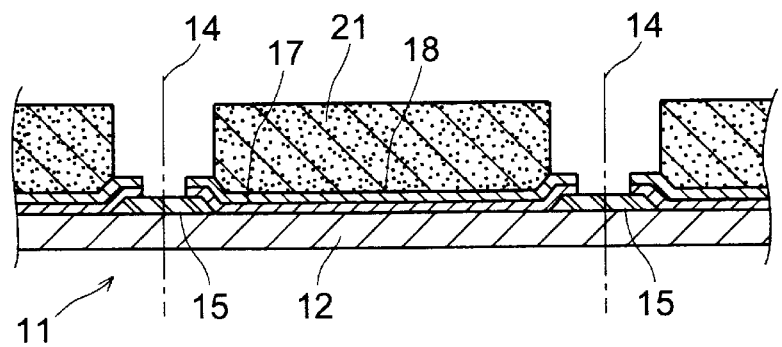
FIG. 11A is an enlarged sectional view at a line XIA—XIA in FIG. 11.
Figure 11B:
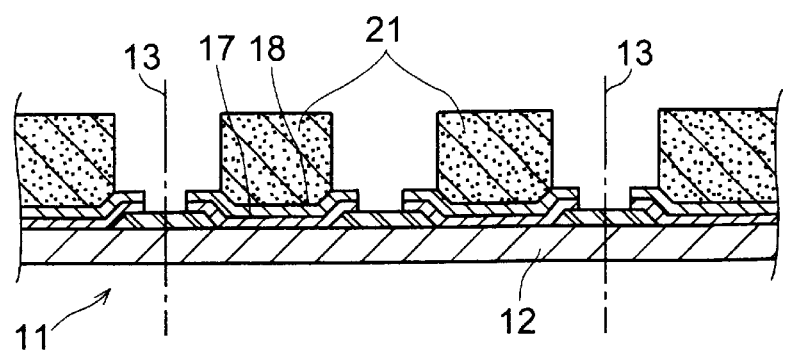
FIG. 11B is an enlarged sectional view at a line XIB—XIB in FIG. 11.
Figure 12:
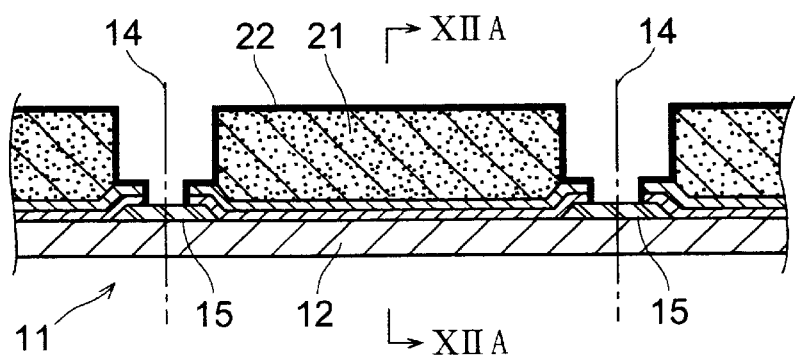
FIG. 12 is an enlarged sectional view showing a state where dielectric films are formed on the respective chips in the first embodiment.
Figure 12A:
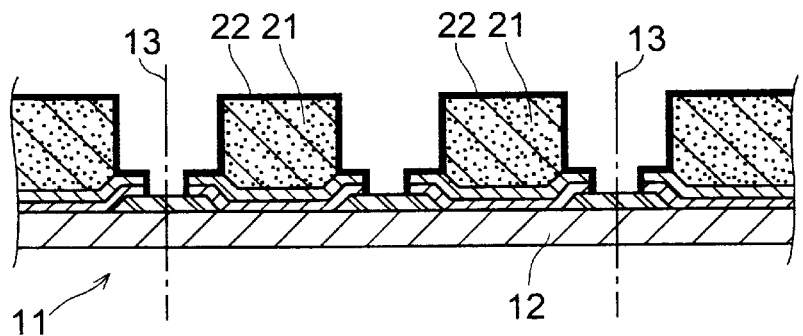
FIG. 12A is a sectional view at a line XIIA—XIIA in FIG. 12.

Next, as shown in FIG. 11, FIG. 11A and FIG. 11B, by removing the forming frame layer 19 by a suitable means such as etching or the like, a plurality of the porous chips 21 are formed on each of the substrates 12 included in the motherboard 11. In addition, the above-described debinder process may be performed after a step of for removing the forming frame layer 19.

Then, the motherboard 11 is, with associated portions formed on the motherboard 11, put in a vacuum heating furnace (not shown), and heated by a sintering temperature of tantalum in vacuum. As a result thereof, the tantalum powder constituting the respective chips 21 are sintered, and at the same time, the chips 21 are melt-adhered to the metallic contact layers 18 made of tantalum, and therefore, the respective chips 21 are electrically connected to the respective substrates 12 of the motherboard 11.

In this sintering step, the thin films 17 which are made of tantalum silicide and function as undercoat layers for the metallic contact layers 18 made of tantalum play actions or operations as follows: If there are not provided with the thin films 17 of tantalum silicide, due to heating in the sintering step, tantalum within the metallic contact layers 18 is abnormally defused into the silicon motherboard 11, and therefore, a coupling, connecting or adhesive strength of each of the chips 21 composed of the tantalum powder to the silicon motherboard 11 is lowered largely. In contrast, by inserting the thin films 17 of tantalum silicide, diffusion of tantalum from the metallic contact layers 18 into the motherboard 11 is prevented, and therefore, it is possible to secure reliability and stability of connections between the chips 21 and the motherboard 11.

Next, the motherboard 11 is, with associated portions formed thereon, immersed in a chemical conversion liquid (not shown) such as an aqueous solution of phosphoric acid, and in such a state, anode oxidation or anodization is performed by applying a DC current between the motherboard 11 and the chemical conversion liquid, so that dielectric films 22 of ditantalum pentaoxide are formed on surfaces of the tantalum powder or particles in the respective chips 21 formed on the substrates 12 and surfaces of exposed portions of the thin films 17 and the metallic contact layers 18.

Figure 13:
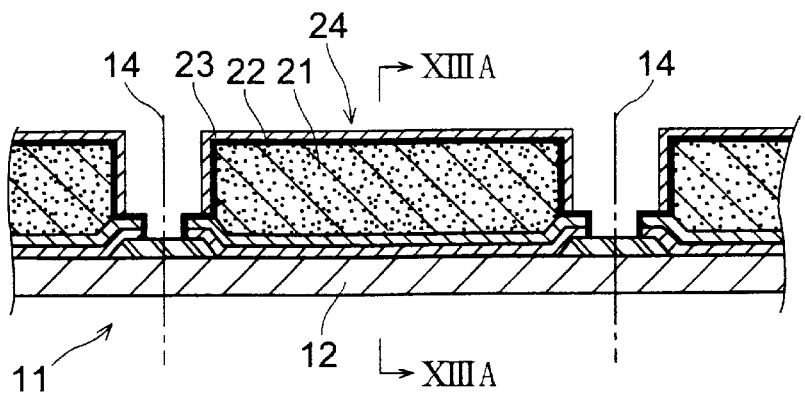
FIG. 13 is an enlarged sectional view showing a state where solid electrolytic layers are formed on the respective chips in the first embodiment.
Figure 13A:
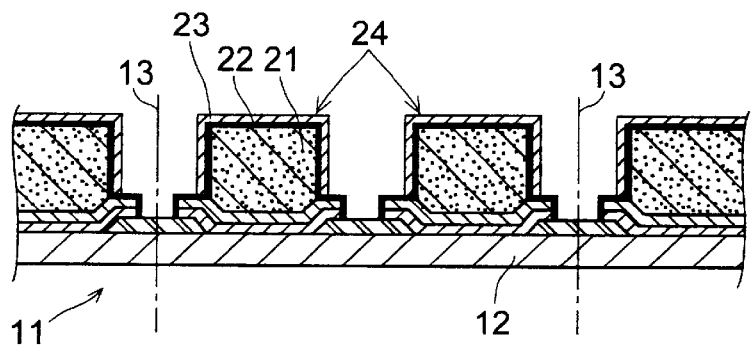
FIG. 13A is a sectional view at a line XIIIA—XIIIA in FIG. 13.

Next, by repeating a plurality of times both of a step where the respective chips 21 formed on the substrate 12 in the motherboard 11 are immersed in an aqueous solution of manganese nitrate (not shown) so as to permeate the aqueous solution of manganese nitrate into an inside of each of the respective chips 21, and a step where the respective chips 21 is pulled-out the aqueous solution of the manganese nitrate and the respective chips 21, as shown in FIG. 13 and FIG. 13A, capacitor elements 24 in which solid electrolytic layers 23 made of manganese dioxide are formed on surfaces of the dielectric films 22 of ditantalum pentaoxide can be obtained.

In addition, it is possible to form the above-described solid electrolytic layers 23 by changing the same to conductive polyelectroyte disclosed, for example, Japanese Patent Application Laying-open No. 60-37114, Japanese Patent Application Laying-open No. 1-253226 and etc. through chemical polymerization, electrolytic oxidation polymerization, gas-phase polymerization and etc.

Figure 14:
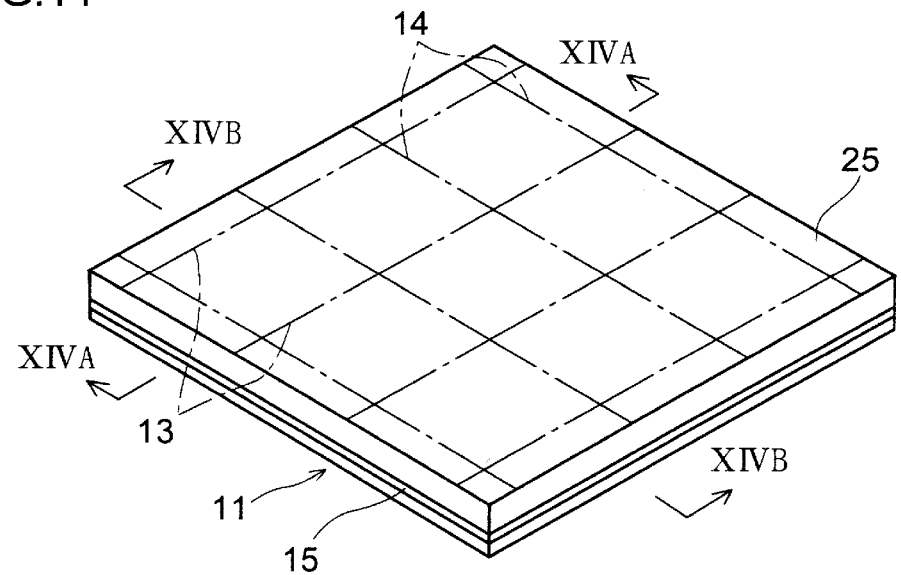
FIG. 14 is a perspective view showing a state where a covering resin layer is applied on the motherboard in the first embodiment.
Figure 14A:
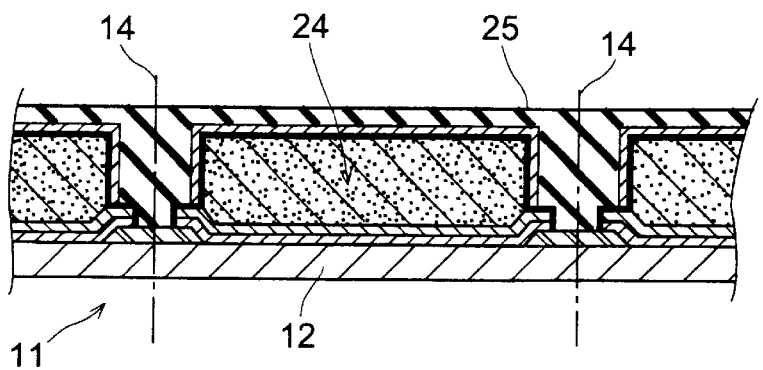
FIG. 14A is an enlarged sectional view at a line XIVA—XIVA in FIG. 14.
Figure 14B:
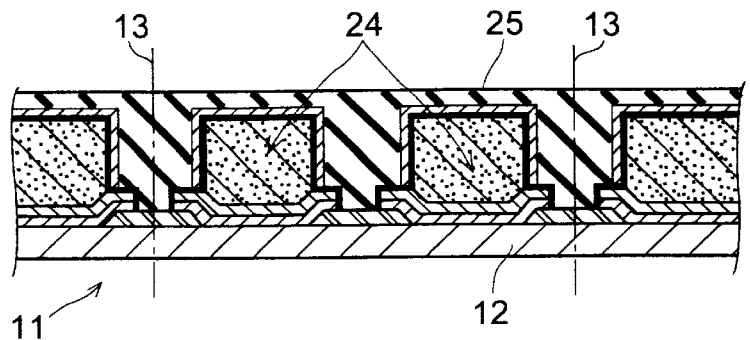
FIG. 14B is an enlarged sectional view at a line XIVB—XIVB in FIG. 14.

Next, after a coating graphite layer (not shown) is formed on whole surfaces of the respective capacitor elements 24, as shown in FIG. 14, FIG. 14A and FIG. 14B, a covering resin layer 25 made of synthetic resin such as polyimide resin, epoxy resin and etc. is formed on the upper surface of the motherboard 11 as a whole in a manner that the whole surfaces of the capacitor elements 24 can be covered by the covering resin layer 25.

Figure 15:
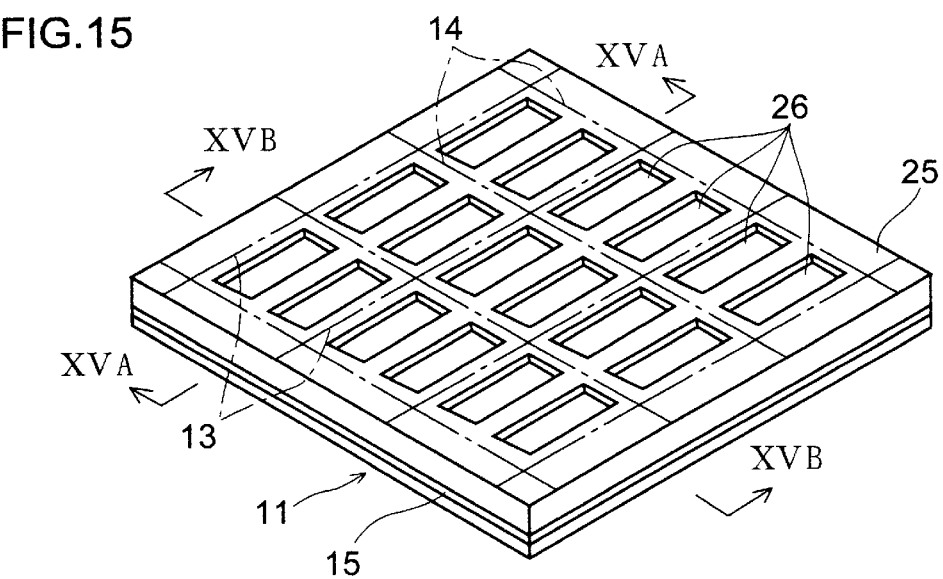
FIG. 15 is a perspective view showing a state where windows are formed on the covering resin layer in the first embodiment.
Figure 15A:
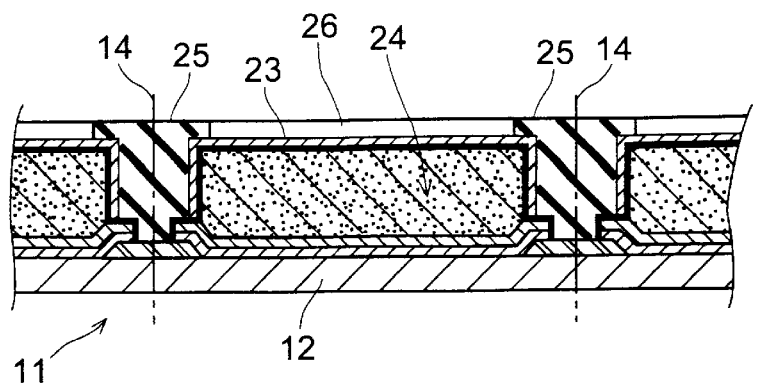
FIG. 15A is an enlarged sectional view at a line XVA—XVA in FIG. 15.
Figure 15B:
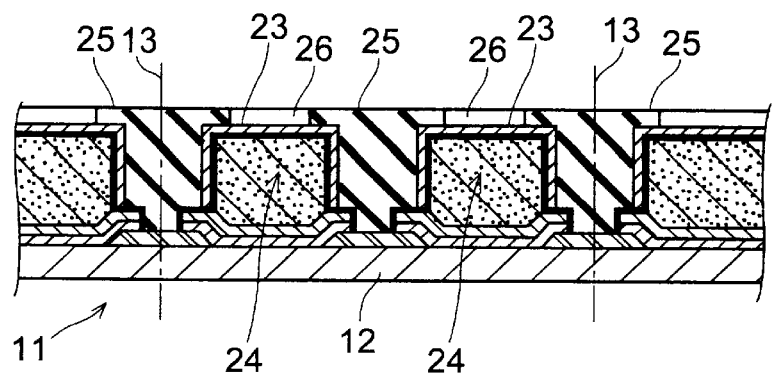
FIG. 15B is an enlarged sectional view at a line XVB—XVB in FIG. 15.

Then, as shown in FIG. 15, FIG. 15A and FIG. 15B, windows 26 are formed on the covering resin layer 25 by a photo-lithography technique, for example, at portions corresponding to upper surfaces of the respective capacitor elements 24.

Figure 16A:
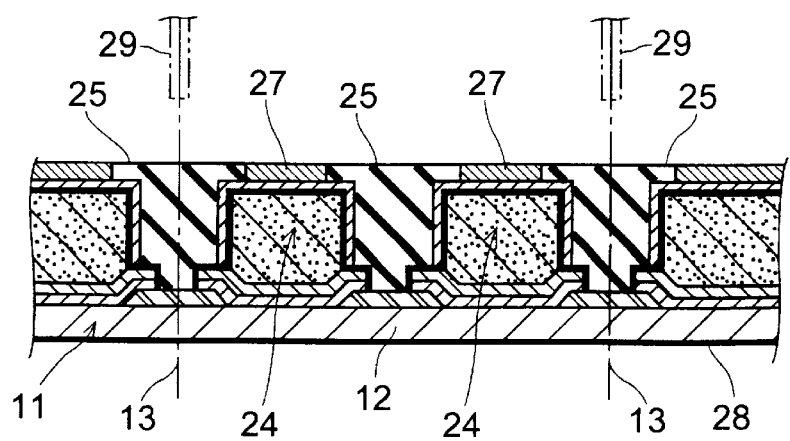
FIG. 16A is a sectional view at a line XVIA—XVIA in FIG. 16.

Next, as shown in FIG. 16 and FIG. 16A, cathode electrodes 27 each composed of an undercoat layer of nickel and an upper layer of solder are formed on the covering resin layer 25 at portions of the windows corresponding to the upper surfaces of the respective capacitor elements 24 by spattering, for example. The cathode electrodes 27 are electrically conducted to the solid electrolytic layers 23 of the capacitor elements 24 via the graphite layers.

On the other hand, as shown in FIG. 16 and FIG. 16A, an anode electrode 28 composed of an undercoat layer of nickel and upper layer of solder is formed on a lower surface of the motherboard 11 by spattering, for example.

Lastly, as similarly shown in FIG. 16 and FIG. 16A, by cutting the motherboard 11 and the covering resin layer 25 by a cutter 29 rotated at a high-speed along the cutting lines 13 and 14, the respective substrates 12 are cut-out from the motherboard 11.

Figure 17A:
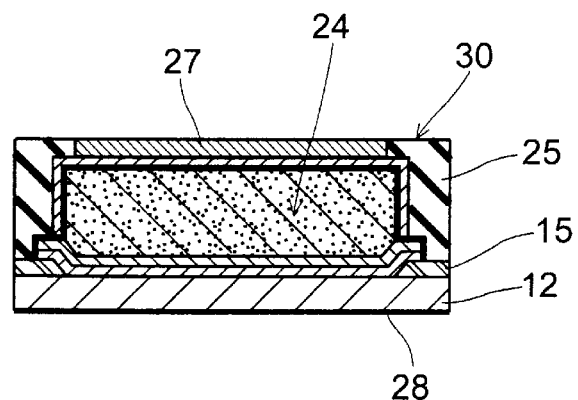
FIG. 17A is a sectional view at a line XVIIA—XVIIA in FIG. 17.
Figure 17B:
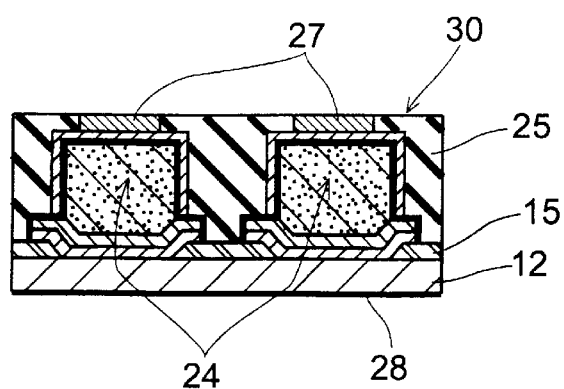
FIG. 17B is a sectional view at a line XVIIB—XVIIB in FIG. 17.

Consequently, a plurality of tantalum solid electrolytic capacitor arrays 30 each having structure shown in FIG. 17, FIG. 17A and FIG. 17B can be simultaneously obtained from the single motherboard 11.

The tantalum solid electrolytic capacitor array 30 is a chip unit having a size of a width W, a length S and a height H, and provided with the single anode electrodes 28 at a lower side of the chip unit and a plurality of (two, in this embodiment) cathode electrodes 27 formed on an upper side of the chip unit. In an equivalent circuit of the tantalum solid electrolytic capacitor array 30, as shown in FIG. 18, the capacitor element 24 by the chip 21 is connected between the single anode electrode 28 and each of the plurality of (two) cathode electrodes 27.

The tantalum solid electrolytic capacitor array 30 includes the substrate 12, and a plurality of (two, in this embodiment shown) of the chips are arranged on the substrate 12 in parallel with each other and each of which is composed of a sintered unit of the tantalum powder, and the solid electrolytic layers 23 each of which is formed so as to be electrically insulated from the tantalum powder of each of the chips 21 by the dielectric layer 22.

The tantalum solid electrolytic capacitor array 30 further includes the covering resin layer 25 which simultaneously covers the respective chips 21 except a central portion on an upper surface of the solid electrolytic layer 23 of each of the chips 21, a plurality of the cathode electrodes 27 which are formed so as to be electrically conducted to exposed portions of the solid electrolytic layer 23 of the respective chips 21, and the single anode electrode 28 which is formed on the lower surface of the substrate 12.

Furthermore, the tantalum powder of each of the chips 21 are conducted to the single anode electrode 28 via the thin film 17 of tantalum silicide, the metallic contact layer 18 and the substrate 12. On the other hand, electrical insulation between the anode electrode and the cathode electrodes in the tantalum solid electrolytic capacitor array 30 is secured by the insulation film 15 which is formed on the upper surface of the substrate 12.

Figure 19:
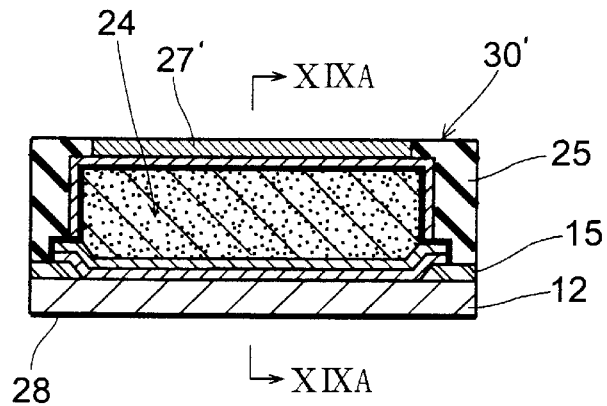
FIG. 19 is an enlarged longitudinally sectional front view showing a solid electrolytic capacitor array of a modified example of the first embodiment.
Figure 19A:
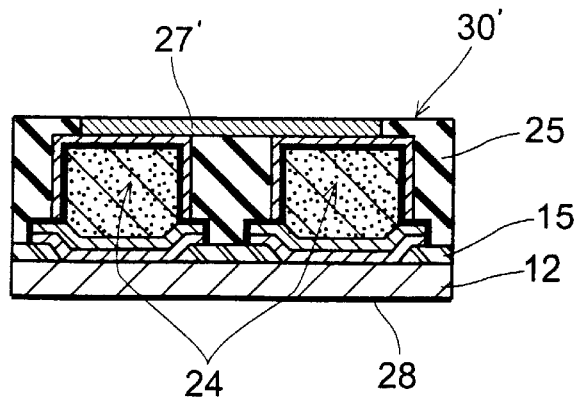
FIG. 19A is a sectional view at a line XIXA—XIXA in FIG. 19
Figure 20:
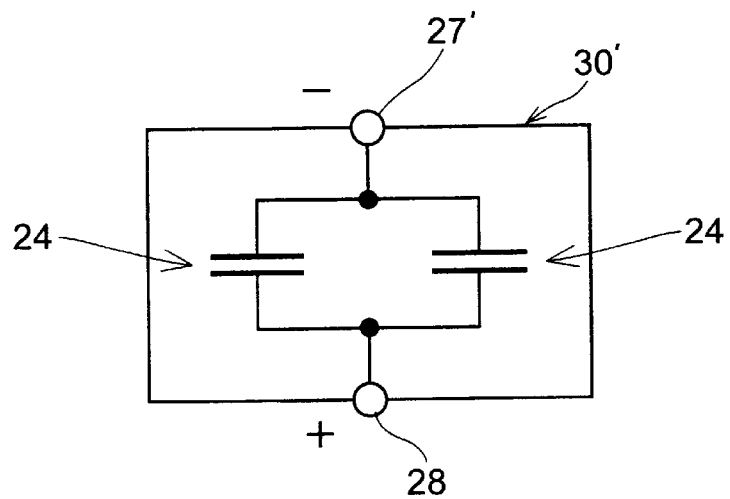
FIG. 20 is an equivalent circuit diagram of the modified example of the solid electrolytic capacitor array.

The first embodiment may be modified as shown in FIG. 19, FIG. 19A and FIG. 20. More specifically, as shown in FIG. 19 and FIG. 19A, by changing the cathode electrodes which are formed on the exposed portions of the solid electrolytic layers 23 of the respective capacitor elements 24 into a single common cathode electrode 27' which is simultaneously electrically conducted to the respective capacitor elements 24, as an equivalent circuit shown in FIG. 20, it is possible to a tantalum solid electrolytic capacitor array 30 in which a plurality of the capacitor elements 24 are provided between the single anode electrode 28 and the single cathode electrode 27' in parallel with each other.

Next, FIG. 21 to FIG. 26A show a second embodiment according to the present invention. In the second embodiment, by utilizing a motherboard made of tantalum, a tantalum solid electrolytic capacitor array 30a (FIG. 26 and FIG. 26A) which is provided with a plurality of capacitor elements can be manufactured.

Figure 21:
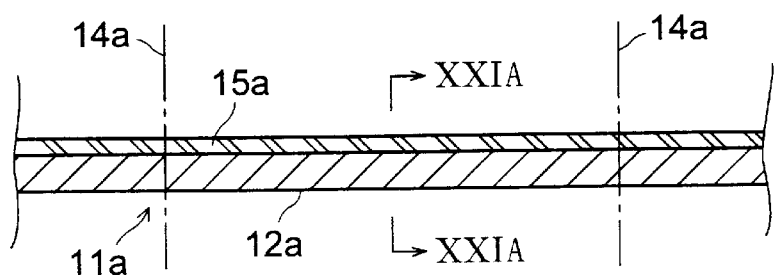
FIG. 21 is an enlarged sectional view showing a motherboard utilized in a second embodiment according to the present invention.
Figure 21A:
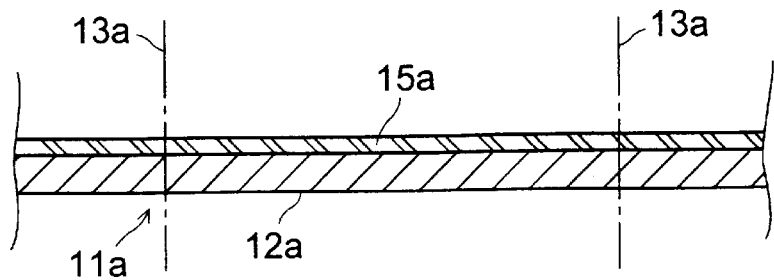
FIG. 21A is sectional view at a line XXIA—XXIA in FIG. 21.

In the second embodiment as shown in FIG. 21 and FIG. 21A, a tantalum motherboard 11a having a size equal to a plurality of substrates 12a is first prepared, and on the motherboard 11a, an insulation film 15a such as oxide film or nitride film is formed by thermal oxidation process, PV spattering, plasma CVD and etc.

Figure 22:
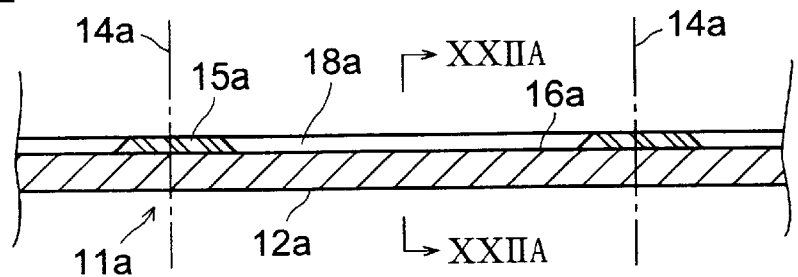
FIG. 22 is an enlarged sectional view showing a state where contact holes are formed in an insulation layer in the second embodiment.
Figure 22A:
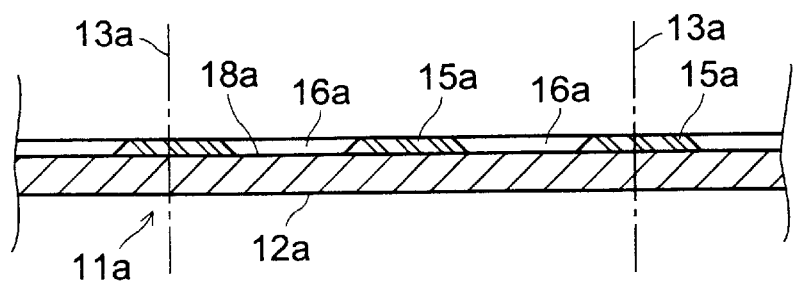
FIG. 22A is a sectional view at a line XXIIA—XXIIA in FIG. 22.

Next, as shown in FIG. 22 and FIG. 22A, a plurality of (two, in this embodiment shown) contact holes 16a are formed in the insulation film 15a at portions each corresponding to each of the substrates 12a by a photolithography technique, for example, whereby a contact surface 18a which is a portion of a surface of the motherboard 11a is exposed within each of the contact holes 16a.

Figure 23:
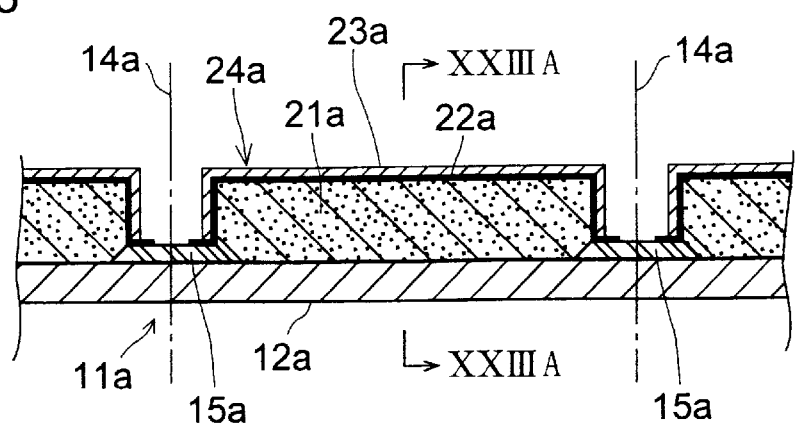
FIG. 23 is an enlarged sectional view showing a state where chips are tamped and formed and then, dielectric films and solid electrolytic layers are formed on the chips in the second embodiment.
Figure 23A:
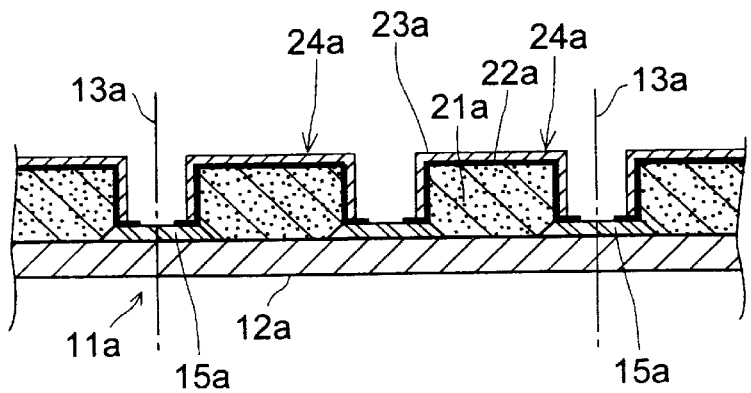
FIG. 23A is a sectional view at a line XXIIIA—XXIIIA in FIG. 23.

Then, as shown in FIG. 23 and FIG. 23A, as similar to a case of the first embodiment, within each of the contact holes 16a, tantalum powder are tamped and formed into a chip 21a, and then, a debinder process is performed, and thereafter, the motherboard 11a is put in a vacuum heating furnace (not shown) such that the motherboard 11a and associated elements are heated by a sintering temperature of tantalum. Consequently, each of the chips 21a composed of the tantalum powder is sintered and melt-adhered to the contact surface 18a, and therefore, the each of the chips 21a is coupled or connected to the motherboard 11a.

Succeeding to the above-described working steps, working steps similar to that of the case of the first embodiment are performed. In these working steps, formation of dielectric films 22a of ditantalum pentaoxide on the respective chips 21a, formation of solid electrolytic layers 23a by manganese dioxide, and formation of a coating graphite layer (not shown) are performed, thereby making the chips 21a into capacitor elements 24a.

Figure 24:
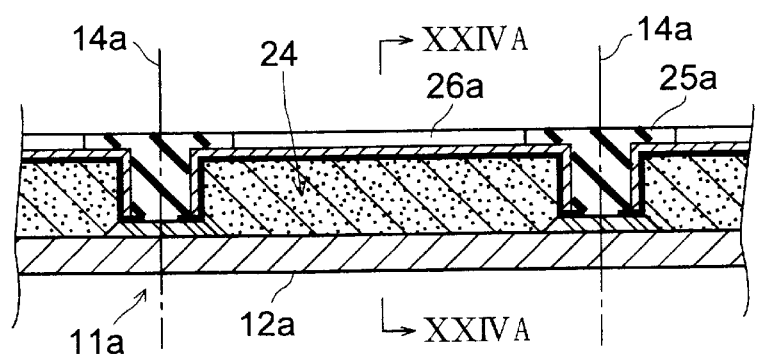
FIG. 24 is an enlarged sectional view showing a state where a covering resin layer is applied on the chips in the second embodiment.
Figure 24A:
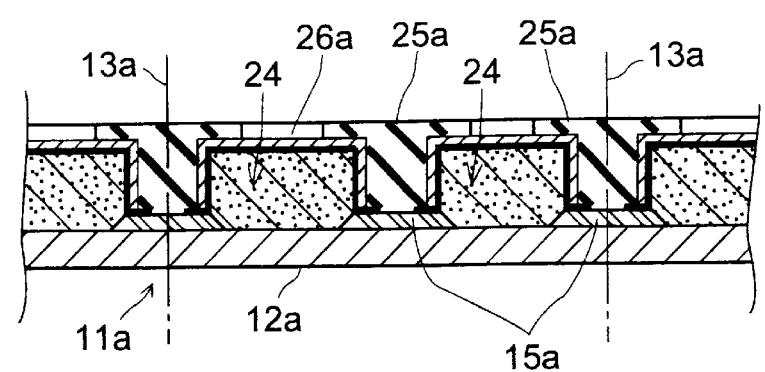
FIG. 24A is a sectional view at a line XXIVA—XXIVA in FIG. 24.
Figure 25:
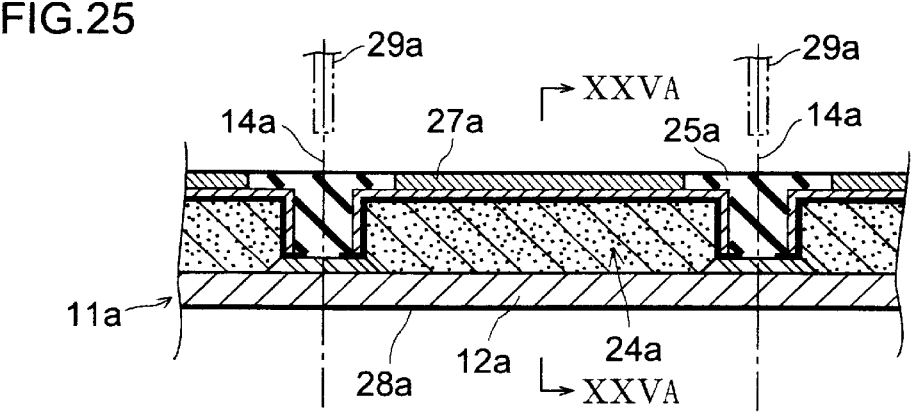
FIG. 25 is an enlarged sectional view showing a state where cathode electrodes and an anode electrode are formed in the second embodiment.
Figure 25A:
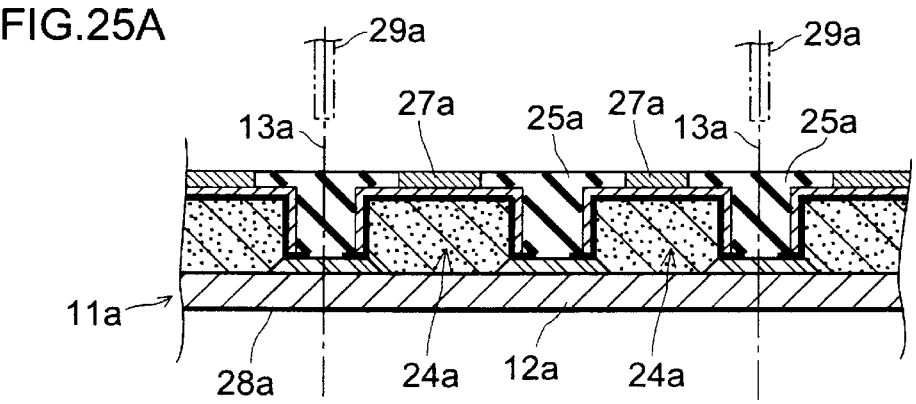
FIG. 25A is a sectional view at a line XXVA—XXVA in FIG. 25.

Then, as shown in FIG. 24 and FIG. 24A, formation of a covering resin layer 25a and formation of windows 26a in the covering resin layer 25a are performed. Thereafter, as shown in FIG. 25 and FIG. 25A, after formation of cathode electrodes 27a on upper surfaces of the capacitor elements 24a, and formation of an anode electrode 28a on a lower surface of the motherboard 11a, the motherboard 11a and the covering resin layer 25a are cut along respective cutting lines 13a and 14a by a cutter 29a being rotated at a high-speed, for example.

Figure 26:
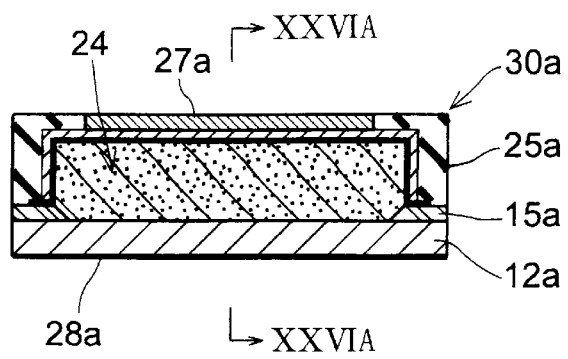
FIG. 26 is an enlarged longitudinally sectional front view showing a solid electrolytic capacitor array according to the second embodiment.
Figure 26A:
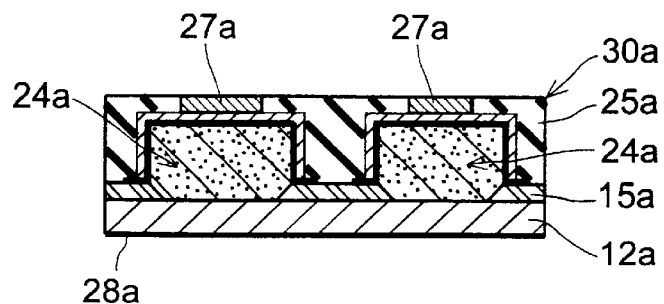
FIG. 26A is a sectional view at a line XXVIA—XXVIA in FIG. 26.

By performing the above described working steps, as shown in FIG. 26 and FIG. 26A, a plurality of tantalum solid electrolytic capacitor arrays 30a each having structure similar to that of the first embodiment can be simultaneously manufactured from a single motherboard.

In addition, in the second embodiment, since the tantalum motherboard 11a utilized, as is different from the first embodiment, it is not necessary to form the metallic contact layers 18 by tantalum and the thin films of tantalum silicide as undercoat layers, and it is possible to utilize the surface itself of the motherboard 11a as the contact surfaces 18a.

In addition, in this case, the insulation layer 15 or 15a similar to that of the first embodiment or the second embodiment may be also formed on the conductive ceramic motherboard.

Furthermore, in a third embodiment shown in FIG. 27 to FIG. 31A, by using a motherboard composed of a material such as silicon, tantalum, conductive ceramic and etc. having electrical conductivity in at least a thickness direction, a tantalum solid electrolytic capacitor array 30b provided with a plurality of capacitor elements and having a larger capacity in comparison with the first embodiment and the second embodiment can be manufactured.

Figure 27:
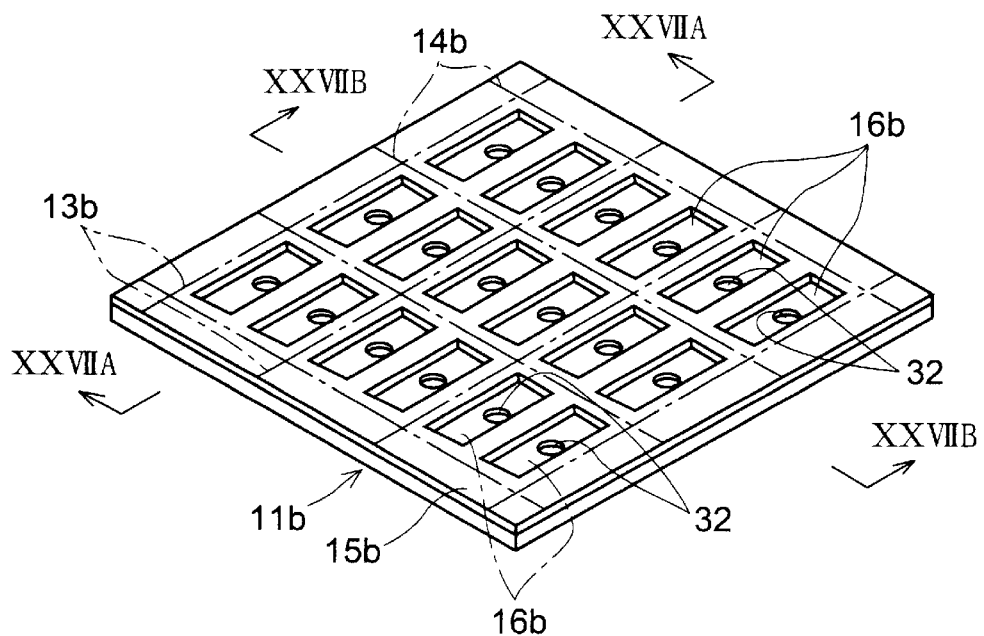
FIG. 27 is a perspective view showing a motherboard utilized in a third embodiment according to the present invention.
Figure 27A:
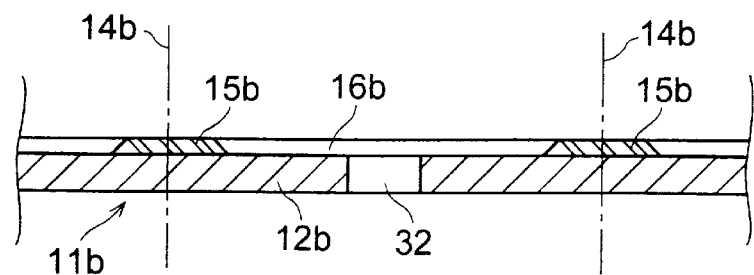
FIG. 27A is an enlarged sectional view at a line XXVIIA—XXVIIA in FIG. 27.
Figure 27B:
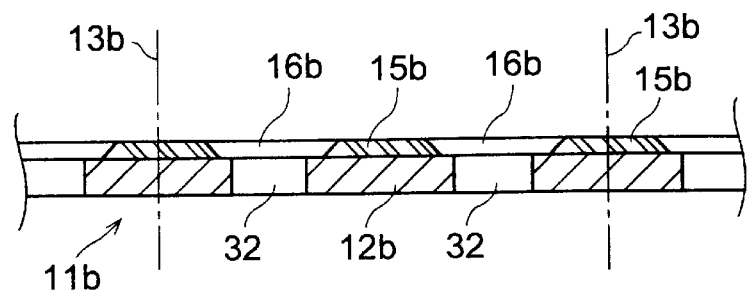
FIG. 27B is an enlarged sectional view at a line XXVIIB—XXVIIB in FIG. 27.

More specifically, as shown in FIG. 27, FIG. 27A and FIG. 27B, after an insulation film 15b is formed on an upper surface of the motherboard 11b, a plurality of (two, in this embodiment shown) contact holes 16b are formed on the insulation film 15b at each of portions corresponding to respective substrates 12b. Furthermore, filling throughholes 32 are formed on the motherboard 11b at positions included in the contact holes 16b of each of the substrates 12b.

Figure 28:
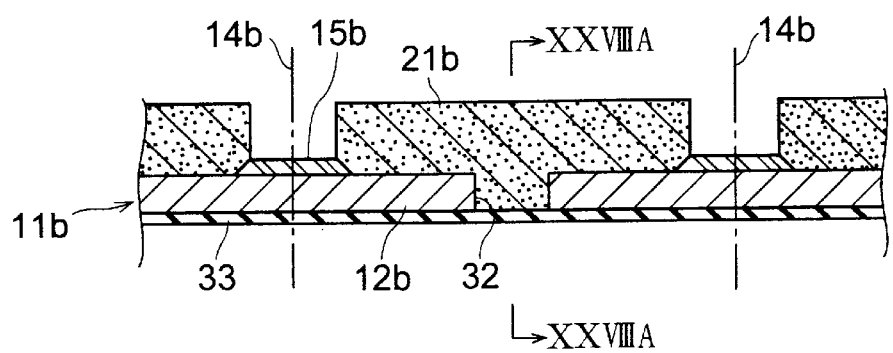
FIG. 28 is an enlarged sectional view showing a state where chips are tamped and formed in the third embodiment.
Figure 28A:
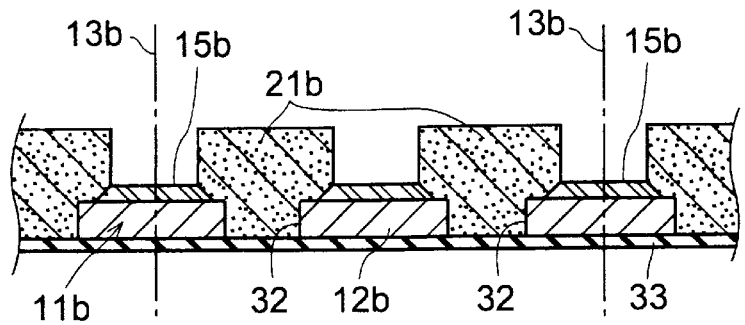
FIG. 28A is a sectional view at a line XXVIIIA—XXVIIIA in FIG. 28.

Next, as shown in FIG. 28 and FIG. 28A, after a film 33 is adhered on a lower surface of the motherboard 11b so as to seal the filling throughholes 32, in a way similar to a way in the first embodiment, respective chips 21b are formed by tamping tantalum powder on the motherboard 11b. In forming the chips 21b, the tantalum powder is filled in each of the filling throughholes 32. The film 33 is removed after the chips 21b are formed.

Figure 29:
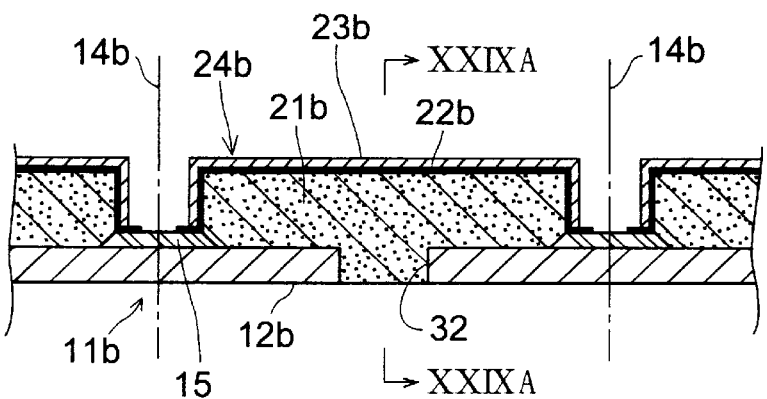
FIG. 29 is an enlarged sectional view showing a state where dielectric films and solid electrolytic layers are formed on the chips in the third embodiment.
Figure 29A:
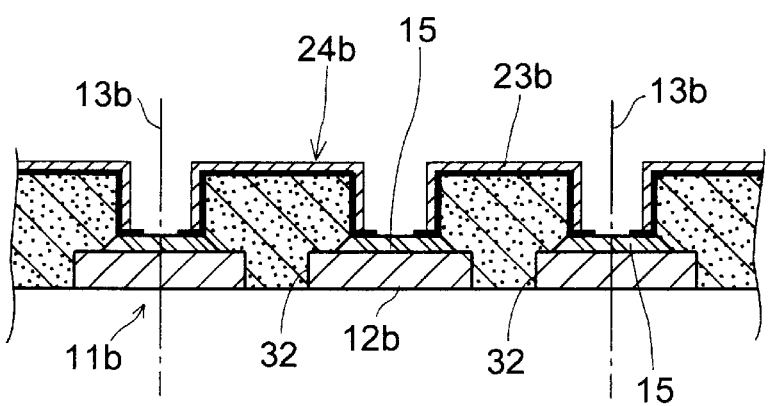
FIG. 29A is a sectional view at a line XXIXA—XXIXA in FIG. 29.

Working steps performed in succeeding to the above-described working steps are working steps similar to that of the above-described first embodiment or the second embodiment. As shown in FIG. 29 and FIG. 29A, these working steps include a sintering step of the respective chips 21b, a forming step of dielectric films 22b for the respective chips 21b, a forming step of solid electrolytic layers 23b, and a step for forming a coating graphite layer, thereby completing the capacitor elements 24b.

Figure 30:
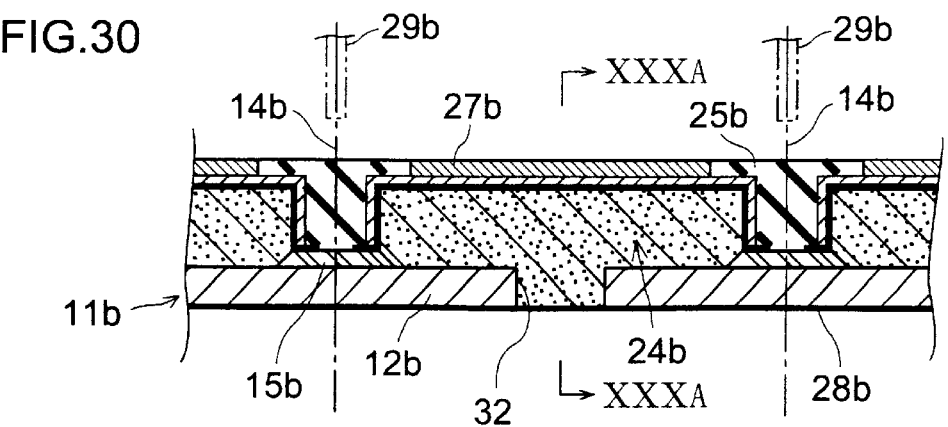
FIG. 30 is an enlarged sectional view showing a state where cathode electrodes and an anode electrode are formed in the third embodiment.
Figure 30A:
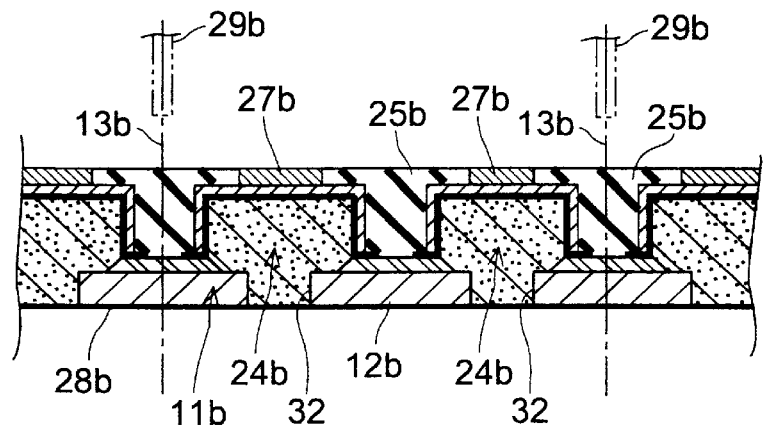
FIG. 30A is a sectional view at a line XXXA—XXXA in FIG. 30.

Furthermore, as shown in FIG. 30 and FIG. 30A, after a forming step of a covering resin layer 25b, a forming step of cathode electrodes 27b and a forming step of an anode electrode 28b, the motherboard 11b and the covering resin layer 25b are cut by a cutter 29b rotated at a high-speed along respective cutting lines 13b and 14b.

Figure 31:
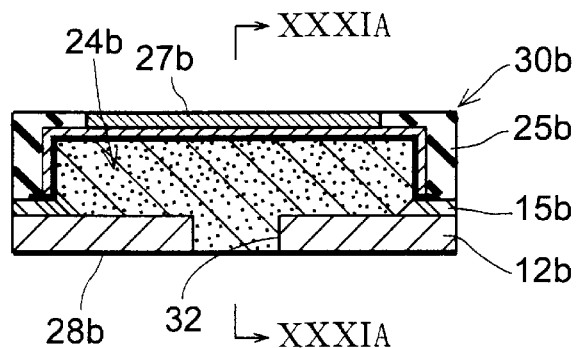
FIG. 31 is an enlarged longitudinally sectional front view showing a solid electrolytic capacitor array according to the third embodiment.
Figure 31A:
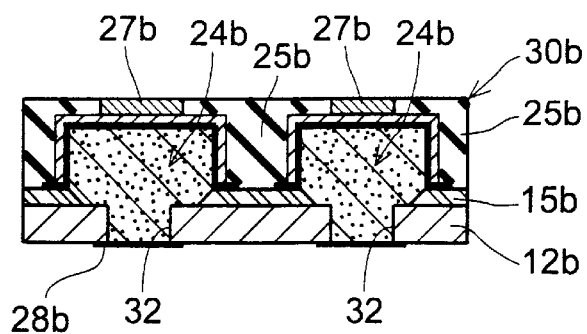
FIG. 31A is a sectional view at a line XXXIA—XXXIA in FIG. 31.

Therefore, from the single motherboard 11b, a plurality of tantalum solid electrolytic capacitor arrays 30b each having structure shown in FIG. 31 and FIG. 31A can be simultaneously manufactured.

According to the third embodiment described in the above, since the tantalum powder for each of the chips 21b are filled in each of the filling throughholes 32 formed on the substrate 21b, it is possible to increase a volume of each of the chips 21b and thus make each of the tantalum solid electrolytic capacitor arrays 30b to have a larger capacity. Furthermore, there is an additional advantage that a coupling or connecting strength between each of the chips 21b and the substrate 12b can be enhanced by a portion of each of the chips filled in each of the filling throughholes 32.

In the third embodiment, the filling throughholes 32 may be replaced with filling holes with bottom or filling recess portions. However, if the throughholes 32 are utilized, it is possible to directly and surely electrically connect the anode electrode 28b formed on the lower surface of the substrate 12b to the tantalum powder of the chip 21b.

Then, FIG. 32 to FIG. 37 show a fourth embodiment according to the present invention, in which with utilizing a motherboard made of insulative material such as ceramic, a plurality of tantalum solid electrolytic capacitor arrays 30c each having a large capacity are simultaneously manufactured.

Figure 32:
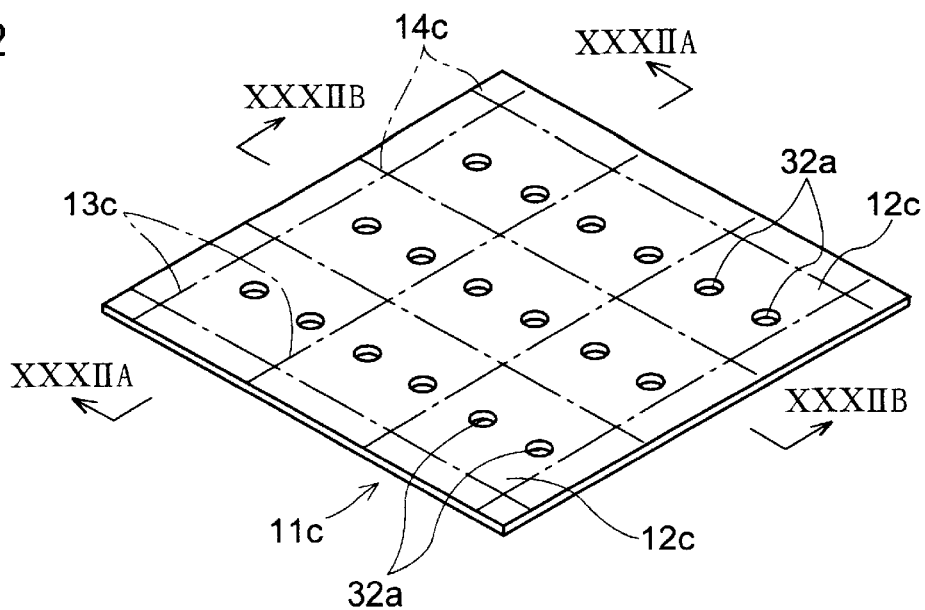
FIG. 32 is a perspective view showing a motherboard utilized in a fourth embodiment according to the present invention.
Figure 32A:
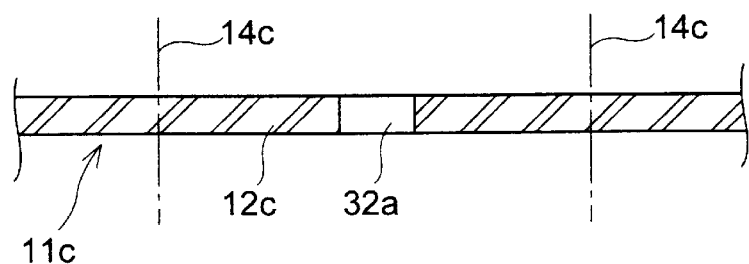
FIG. 32A is an enlarged sectional view at a line XXXIIA—XXXIIA in FIG. 32.
Figure 32B:
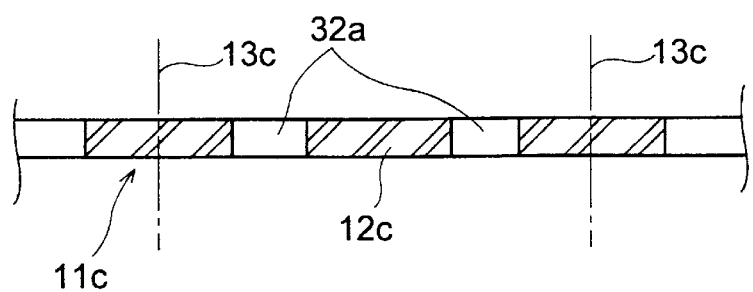
FIG. 32B is an enlarged sectional view at a line XXXIIB—XXXIIB in FIG. 32.

In the fourth embodiment, as shown in FIG. 32, FIG. 32A and FIG. 32B, first, a motherboard 11c made of insulative ceramic material and having a size equal to a plurality of substrates 12c is prepared, and filling throughholes 32a are formed on the motherboard 11c at positions included in each of the substrates 12c.

Figure 33:
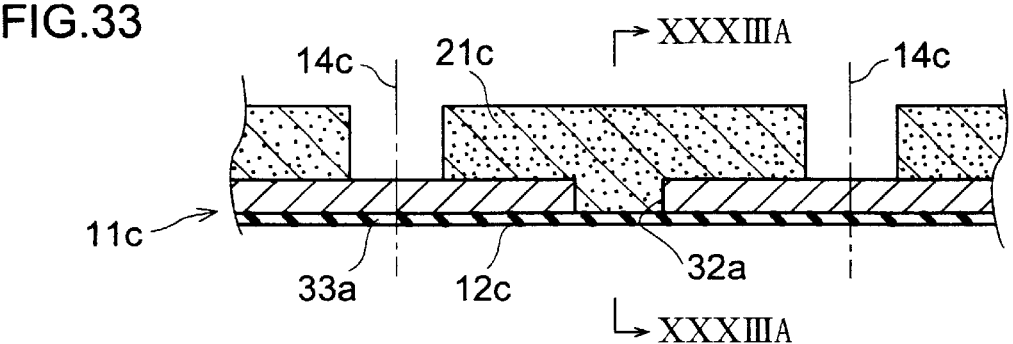
FIG. 33 is an enlarged sectional view showing a state where chips are tamped and formed in the fourth embodiment.
Figure 33A:
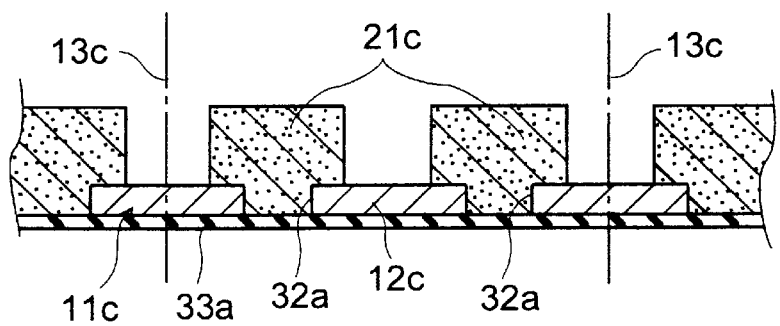
FIG. 33A is a sectional view at a line XXXIIIA—XXXIIIA in FIG. 33.

Next, as shown in FIG. 33 and FIG. 33A, after a film 33a is adhered on a lower surface of the motherboard 11c to seal the filling throughholes 32a, in a way similar to a way in the first embodiment, respective chips 21c are formed by tamping tantalum powder on the motherboard 11c. In forming the chips 21c, the tantalum powder is filled in each of the filling throughholes 32a. The film 33a is removed after the chips 21c are formed.

Figure 34:
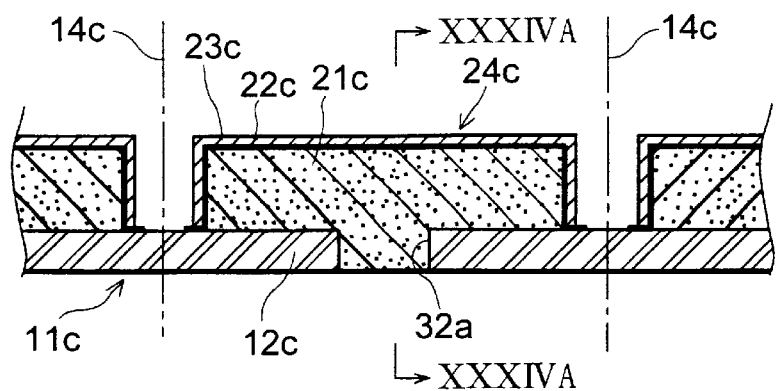
FIG. 34 is an enlarged sectional view showing a state where dielectric films and solid electrolytic layers are formed on the respective chips in the fourth embodiment.
Figure 34A:
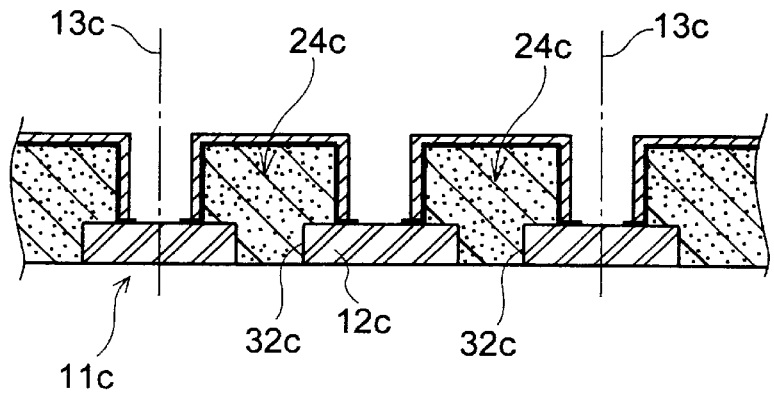
FIG. 34A is a sectional view at a line XXXIVA—XXXIVA in FIG. 34.

Working steps performed in succeeding to the above-described working steps are working steps similar to the above-described embodiments. As shown in FIG. 34 and FIG. 34A, these working steps include a sintering step of the respective chips 21c, a forming step of dielectric films 22c for the respective chips 21b, a forming step of solid electrolytic layers 23c, and a step for forming a coating graphite layer, whereby capacitor elements 24c can be obtained.

Figure 35:
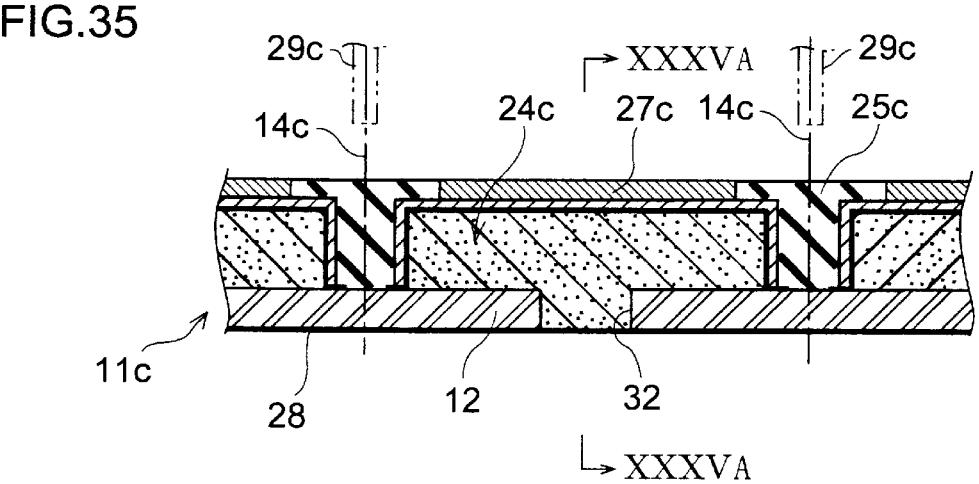
FIG. 35 is an enlarged sectional view showing a state where cathode electrodes and an anode electrode are formed in the fourth embodiment.
Figure 35A:
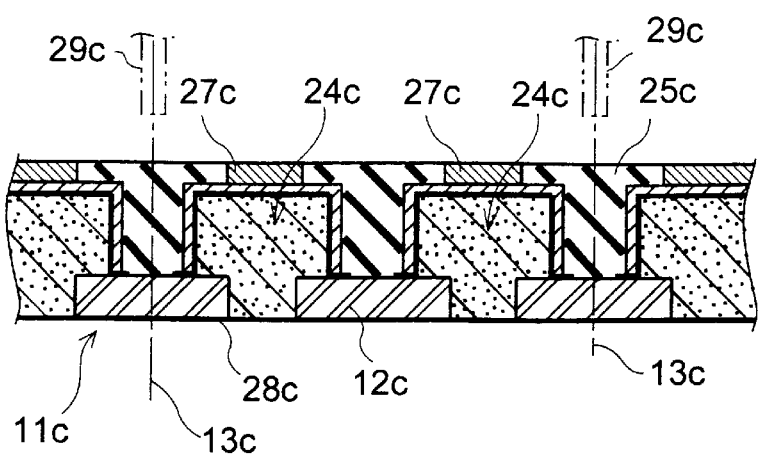
FIG. 35A is a sectional view at a line XXXVA—XXXVA in FIG. 35.

Furthermore, as shown in FIG. 35 and FIG. 35A, after a forming step of a covering resin layer 25c, a forming step of cathode electrodes 27cand a forming step of an anode electrode 28c, the motherboard 11c and the covering resin layer 25c are cut by a cutter 29c rotated at a high-speed along respective cutting lines 13c and 14c.

Figure 36:
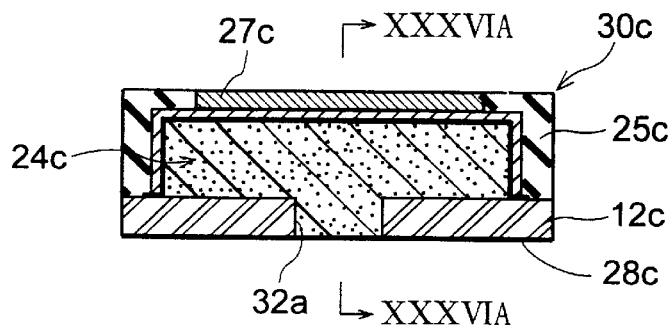
FIG. 36 is an enlarged longitudinally sectional front view showing a solid electrolytic capacity array according to the fourth embodiment.
Figure 36A:
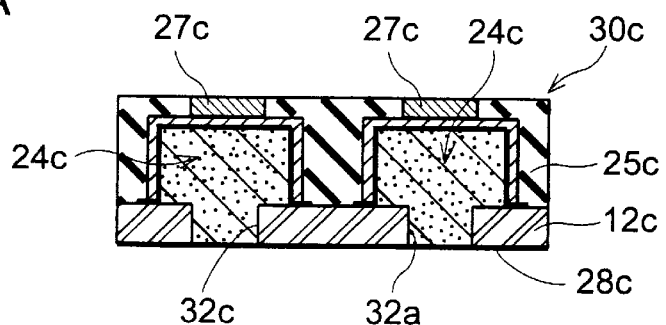
FIG. 36A is a sectional view at a line XXXVIA—XXXVIA in FIG. 36.
Figure 37:
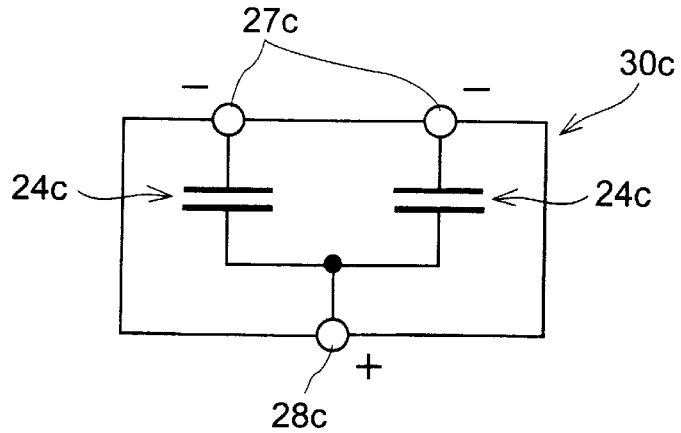
FIG. 37 is an equivalent circuit diagram of the solid electrolytic capacitor array according to the fourth embodiment.

Therefore, from the single motherboard 1c, a plurality of tantalum solid electrolytic capacitor arrays 30c each having structure shown in FIG. 36, FIG. 36A and FIG. 37 can be simultaneously manufactured.

In the above-described fourth embodiment, as similar to the third embodiment, since the tantalum powder for each chip 21c are filled within the filling throughhole 32a formed on the substrate 12c, a capacity of the tantalum solid electrolytic capacitor array 30c can be made larger.

In addition, in the fourth embodiment, since the substrate 12c is made of the insulative material such as ceramic, even if no further insulation layer is formed on the substrate 12c, it is possible to surely electrically insulate the anode electrode and the cathode electrode of the capacitor element 24d. Therefore, in comparison with a case where the substrate 12d is made of a conductive material, there is an advantage that it is possible to reduce a cost and a weight.

In the fourth embodiment, since the substrate 12c is made of insulative material such as ceramic, it is possible to vary or modify the tantalum solid electrolytic capacitor array 30c as set forth in the following.

Figure 38:
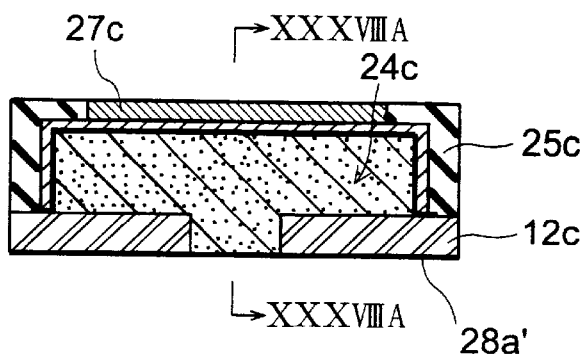
FIG. 38 is an enlarged longitudinally sectional view showing a solid electrolytic capacitor array of a modified example of the fourth embodiment.
Figure 38A:
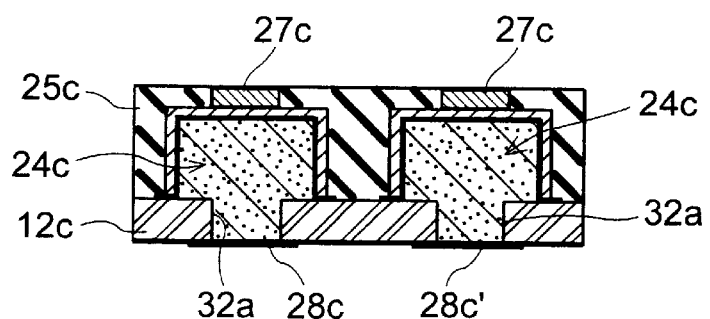
FIG. 38A is a sectional view at a line XXXVIIIA—XXXVIIIA in FIG. 38.
Figure 39:
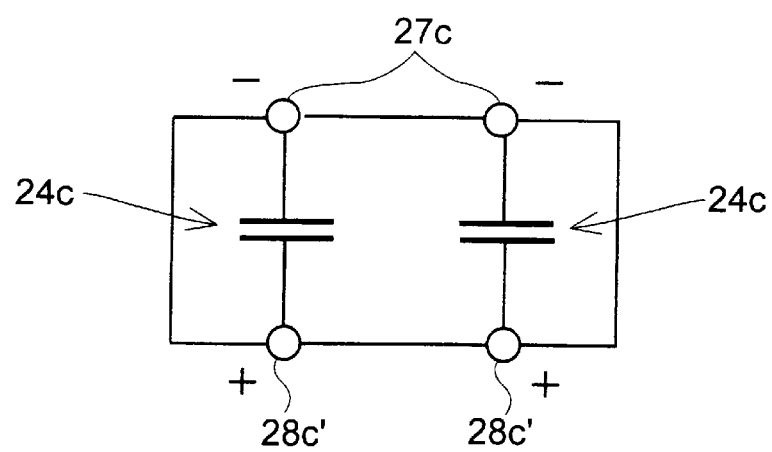
FIG. 39 is an equivalent circuit diagram of the solid electrolytic capacitor array of FIG. 38.

More specifically, as shown in FIG. 38 and FIG. 38A, by dividing the anode electrode formed on the lower surface of the substrate 12c into two discrete anode electrodes 28c' for the respective capacitors elements 24c, as shown in an equivalent circuit of FIG. 39, it is possible to obtain structure that the capacitor element 24c is provided between each of the two anode electrodes 28c' and each of the two cathode electrodes 27c.

Figure 40:
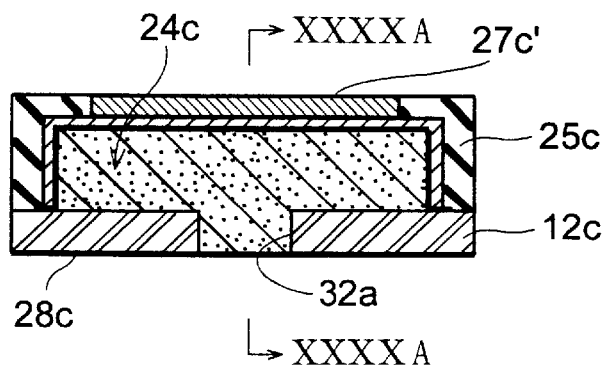
FIG. 40 is an enlarged longitudinally sectional front view showing a solid electrolytic capacitor array of a further modified example of the fourth embodiment.
Figure 40A:
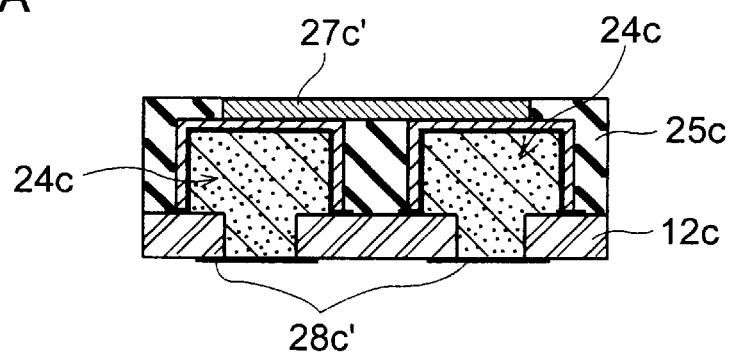
FIG. 40A is a sectional view at a line XXXXA—XXXXA in FIG. 40.
Figure 41:
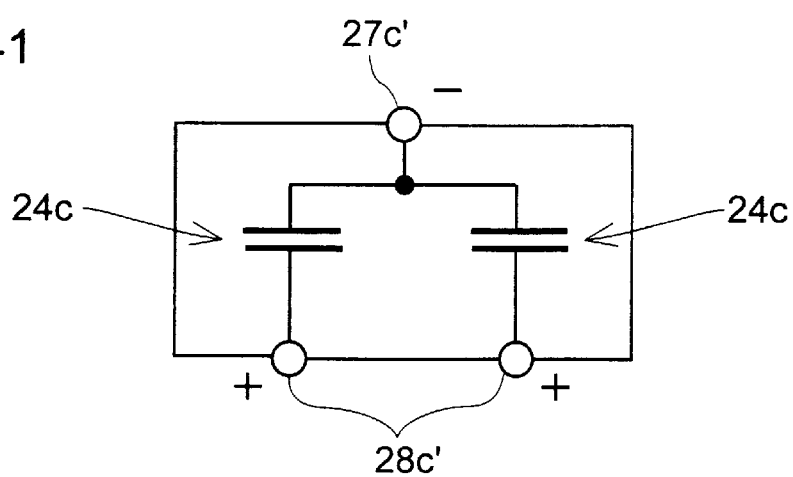
FIG. 41 is an equivalent circuit diagram of the solid electrolytic capacitor array in FIG. 40.

Furthermore, as shown in FIG. 40 and FIG. 40A, in addition to that the anode electrode formed on the lower surface of the substrate 12c is divided into two discrete anode electrodes 28c' for the capacitor elements 24c, if the cathode electrodes formed on the exposed portions of the solid electrolytic layers 23c of the capacitor elements 24c are formed as a single common cathode electrode 27c' which is simultaneously electrically conducted to the capacitor elements 24c, as shown in an equivalent circuit of FIG. 41, it is possible to obtain structure that a plurality of capacitor elements 24c are provided between the two anode electrodes 28c' and the single cathode electrode 27c' and in parallel with each other.

Figure 42:
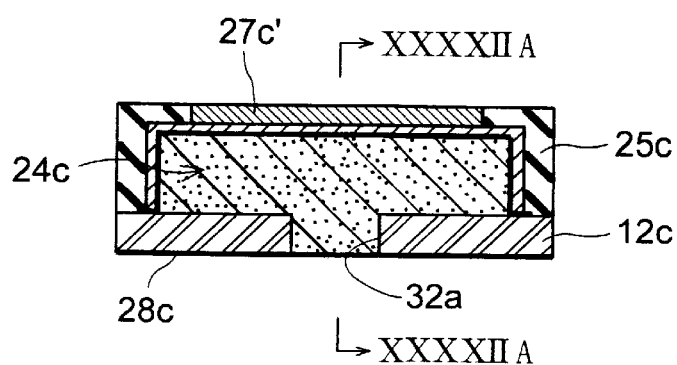
FIG. 42 is an enlarged longitudinally sectional front view showing a solid electrolytic capacitor array according to a still further modified example of the fourth embodiment.
Figure 42A:
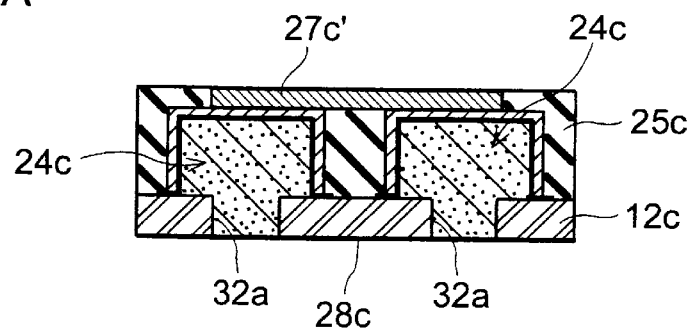
FIG. 42A is a sectional view at a line XXXXIIA—XXXXIIA in FIG. 42.
Figure 43:
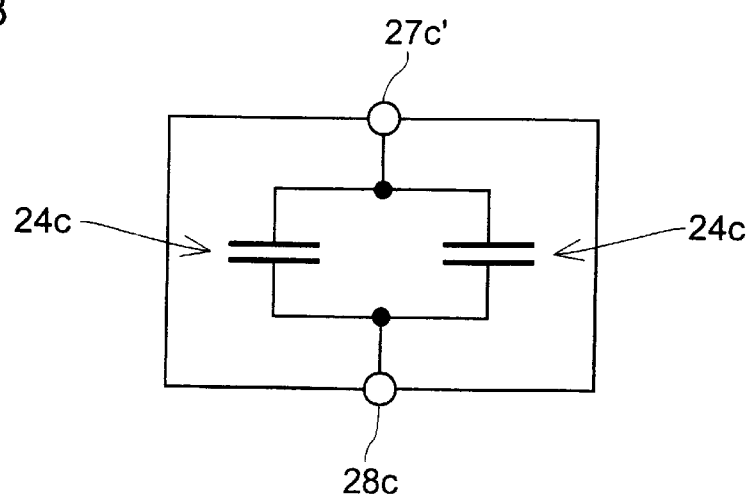
FIG. 43 is an equivalent circuit diagram of the solid electrolytic capacitor array of FIG. 42.

Furthermore, as shown in FIG. 42 and FIG. 42A, by changing the cathode electrodes formed on the exposed portions of the solid electrolytic layers 23c of the capacitor elements 24c into a single common cathode electrode 27c' which is simultaneously electrically conducted to the respective capacitor elements 24c, as shown by an equivalent circuit in FIG. 43, it is possible to obtain structure that a plurality of the capacitor elements 24c are provided in parallel with each other between the single anode electrode 28c and the single cathode electrode 27c'.

In addition, in the above-described embodiments, examples of the solid electrolytic capacitor array having two capacitor elements were described. However, the present invention is not limited thereto, and can be applied to a case where a solid electrolytic capacitor array is constructed by three or more capacitor elements.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for manufacturing solid electrolytic capacitor arrays, comprising steps of:
   (a) preparing a motherboard having an area from which a plurality of substrates can be cutout;
   (b) respectively forming a plurality of chips on said plurality of substrates included in said motherboard, each of said plurality of chips being formed by sintering metallic powder;
   (c) forming a plurality of solid electrolytic layers on surfaces of said plurality of chips, respectively, in a manner that each of said plurality of solid electrolytic layers is electrically insulated from said metallic powder, said plurality of solid electrolytic layers being independent from each other;
   (d) forming a covering resin layer which covers said plurality of chips in a manner that portions of said plurality of solid electrolytic layers are exposed;
   (e) forming at least one cathode electrode on said covering resin layer, said cathode electrode being electrically connected to each of said plurality of solid electrolytic layers;
   (f) forming at least one anode electrode on a lower surface of said motherboard, said anode electrode being electrically connected to said metallic powder of each of said plurality of chips; and
   (g) cutting-out said plurality of substrates from said motherboard.

2. A manufacturing method according to claim 1, wherein said step (b) includes (b-1) arranging a frame in which a plurality of filling spaces are respectively formed on said plurality of substrates on said motherboard; (b-2) filling said metallic powder in each of said plurality of filling spaces; (b-3) removing said frame; and (b-4) sintering filled metallic powder.

3. A manufacturing method according to claim 2, said step (a) includes (a-1) preparing a motherboard having an electrical conductivity in at least a thickness direction, said method further comprising, prior to said step (b), steps of (f) forming an insulation layer on which a plurality of contact holes are formed at positions each corresponding to each of said plurality of substrates on said motherboard, and (i) forming a plurality of contact layers on said insulation layer, which being connected to said plurality of substrates via said contact holes, respectively, and in said step (b-2), said metallic powder are filled on said plurality of contact layers.

4. A manufacturing method according to claim 3, wherein said step (i) includes steps of (i-1) forming a plurality of diffusion preventing layers on said plurality of substrates prior to forming of said plurality of contact layers, and (i-2) forming said plurality of contact layers being made of metallic material on said plurality of diffusion preventing layers.

5. A manufacturing method according to claim 2, wherein said step (a) includes a step (a-1) preparing a motherboard on which a filling recess portion is formed at a position equal to each of said plurality of substrates, and in said step (b-2), said metallic powder is filled in said filling recess portion and said filling space.

6. A manufacturing method according to claim 5, wherein said step (a-1) includes a step (a-11) preparing a motherboard in which a throughhole is formed at a position equal to each of said plurality of substrates, and said step (b-2) includes steps of (b-21) sealing a lower portion of said throughhole by a sheet, (b-22) filling said metallic powder in said throughhole and said filling space, and (b-23) removing said sheet, and in said step (f) said anode electrode is formed in a manner that said anode electrode is directly connected to said plurality of chips which are exposed at said lower surface of said plurality of throughholes.

7. A manufacturing method according to claim 6, wherein in said step (a) a motherboard made of insulative material is prepared.

8. A manufacturing method according to claim 6, wherein in said step (a) a motherboard having an electrical conductivity in at least a thickness direction is prepared.

* * * * *